(12) United States Patent
Kim et al.

(10) Patent No.: US 12,296,476 B2
(45) Date of Patent: May 13, 2025

(54) TENDON-SHEATH DRIVING APPARATUS

(71) Applicant: Endo Robotics Co., Ltd., Seoul (KR)

(72) Inventors: Kyungnam Kim, Seoul (KR); Byung Gon Kim, Seoul (KR); Yechan Seo, Seoul (KR)

(73) Assignee: Endo Robotics Co., Ltd., Seoul (KR)

( * ) Notice: Subject to any disclaimer, the term of this patent is extended or adjusted under 35 U.S.C. 154(b) by 101 days.

(21) Appl. No.: 17/804,412

(22) Filed: May 27, 2022

(65) Prior Publication Data

US 2022/0379466 A1 Dec. 1, 2022

(30) Foreign Application Priority Data

May 28, 2021 (KR) .......... 10-2021-0068996
Jul. 15, 2021 (KR) .......... 10-2021-0092860
Jul. 15, 2021 (KR) .......... 10-2021-0092861

(51) Int. Cl.
*B25J 9/10* (2006.01)
*F16C 1/06* (2006.01)

(52) U.S. Cl.
CPC .......... *B25J 9/1075* (2013.01); *F16C 1/06* (2013.01); *B25J 9/104* (2013.01)

(58) Field of Classification Search
CPC . B25J 9/1075; B25J 9/104; F16C 1/06; F16C 1/126
USPC ...................................... 74/490.04
See application file for complete search history.

(56) References Cited

U.S. PATENT DOCUMENTS

| | | | | |
|---|---|---|---|---|
| 130,253 A * | 8/1872 | Stow | .......... | F16C 1/06 464/183 |
| 225,516 A * | 3/1880 | Gates | .......... | F16C 1/06 464/53 |
| 746,451 A * | 12/1903 | Brown | .......... | F16C 1/06 292/DIG. 16 |
| 889,521 A * | 6/1908 | Hale | .......... | F16D 3/32 464/174 |

(Continued)

FOREIGN PATENT DOCUMENTS

| FR | 2956887 A1 * | 9/2011 | .......... F16C 1/06 |
|---|---|---|---|
| JP | 2001-263557 A | 9/2001 | |

(Continued)

OTHER PUBLICATIONS

Office Action from European Application No. 22175841.0 dated Nov. 2, 2022.

(Continued)

*Primary Examiner* — T. Scott Fix
(74) *Attorney, Agent, or Firm* — Knobbe, Martens, Olson, & Bear, LLP

(57) ABSTRACT

Disclosed is a tendon-sheath driving apparatus. A tendon-sheath driving apparatus according to an embodiment of the disclosure includes: a sheath having a predetermined length, being flexible and having a hollow shape; a tendon placed inside a hollow of the sheath; a rod coupled to an outer surface of a first side of the tendon, and having higher rigidity than the sheath; and a pipe coupled to an outer surface of a first side of the sheath, and having higher rigidity than the sheath, wherein the tendon is moved through the sheath and the pipe as the rod is moved being guided by the pipe while a portion of the rod is placed inside the pipe.

19 Claims, 17 Drawing Sheets

(56) References Cited

U.S. PATENT DOCUMENTS

| | | | | |
|---|---|---|---|---|
| 906,113 | A * | 12/1908 | Curtis | F16C 1/06 |
| | | | | 464/57 |
| 4,205,791 | A | 6/1980 | Dooley | |
| 8,365,633 | B2 * | 2/2013 | Simaan | A61B 90/50 |
| | | | | 606/1 |
| 8,414,598 | B2 * | 4/2013 | Brock | A61B 34/71 |
| | | | | 606/130 |
| 2005/0277875 | A1 | 12/2005 | Selkee | |
| 2006/0243086 | A1 | 11/2006 | Cutkosky et al. | |
| 2010/0011901 | A1 | 1/2010 | Burbank | |
| 2012/0194120 | A1 | 8/2012 | Reiland et al. | |
| 2018/0280178 | A1 | 10/2018 | Shimada et al. | |

FOREIGN PATENT DOCUMENTS

| | | | |
|---|---|---|---|
| JP | 2013-031637 | A | 2/2013 |
| JP | 2015-194236 | A | 11/2015 |
| JP | 2018-017029 | A | 2/2018 |
| JP | 2020-518353 | A | 6/2020 |
| KR | 10-2020-0104710 | A | 9/2020 |
| WO | 2017/187617 | A1 | 11/2017 |
| WO | WO 2020/082179 | A1 | 4/2020 |

OTHER PUBLICATIONS

Office Action dated Mar. 6, 2023 in corresponding Korean Application No. 10-2021-0092860.
Office Action dated May 9, 2023 in corresponding Japanese Application No. 2022-086720.

* cited by examiner

TENDON-SHEATH DRIVING APPARATUS

CROSS REFERENCE TO RELATED APPLICATION

The present application claims priority to Korean Patent Application No. 10-2021-0068996, filed with the Korean Intellectual Property Office on May 28, 2021, Korean Patent Application No. 10-2021-0092860, filed with the Korean Intellectual Property Office on Jul. 15, 2021, and Korean Patent Application No. 10-2021-0092861, filed with the Korean Intellectual Property Office on Jul. 15, 2021, the entire contents of which are incorporated herein by reference.

BACKGROUND

Field

The disclosure relates to a tendon-sheath driving apparatus, and more particularly, to a tendon-sheath driving apparatus for precisely actuating a robot.

Description of the Related Art

When an actuator is not allowed to be directly installed due to space constraints and a robot arm also needs to be flexibly bent to enter, a tendon-sheath driving method of transmitting force through two flexible cables is used. There are various types based on the methods of using the tendon-sheath to drive a rotary joint, and it is called a double-input tendon-sheath that a motor or the like actuator is provided at opposite ends to perform active control according to rotating directions. In the double-input tendon-sheath, a master tendon is driven in a rotating direction, and a slave tendon is correspondingly followed at the opposite side. The master and slave roles are also reversed when the rotating direction is changed.

The disclosure of this section is to provide background information relating to the present disclosure. Applicant does not admit that any information contained in this section constitutes prior art.

SUMMARY

Generally, in the slave tendon driven by force applied from the master tendon, a portion not inserted in the sheath but exposed to the outside is loosened and bent or increases friction, thereby causing significant backlash and reducing the degree of precision, whereas the master tendon does not cause such things because it is directly pulled by the motor, but.

Accordingly, there is a need for a method of reducing backlash while preventing the slave tendon from being loosened and bent.

An aspect of the disclosure is to provide a tendon-sheath driving apparatus for precisely controlling the movement of a tendon connected to a robot.

The aspects of the disclosure are not limited to those mentioned above, and other unmentioned aspects will become apparent to a person skilled in the art by the following descriptions.

According to an embodiment of the disclosure, there is provided a tendon-sheath driving apparatus including: a sheath having a predetermined length, being flexible and having a hollow shape; a tendon placed inside a hollow of the sheath; a rod coupled to an outer surface of a first side of the tendon, and having higher rigidity than the sheath; and a pipe coupled to an outer surface of a first side of the sheath, and having higher rigidity than the sheath, wherein the tendon is moved through the sheath and the pipe as the rod is moved being guided by the pipe while a portion of the rod is placed inside the pipe.

In this case, an outer diameter of the rod may be smaller than an inner diameter of the pipe.

In this case, the inner diameter of the pipe may be greater than or equal to an inner diameter of the sheath, and In this case, a moving space in which the rod is movable may be formed between the tendon and the pipe.

In this case, an actuator may be provided to actuate the rod to move relative to the pipe.

In this case, the tendon-sheath driving apparatus may further include a first holder configured to hold the rod so that the rod can move relative to the pipe in a lengthwise direction; and a second holder configured to support the pipe, wherein the actuator actuates the first holder to move.

In this case, the first holder may include a first lower holder including a first groove in which a portion of the rod is inserted; and a first upper holder including a second groove in which another portion of the rod is inserted, and coupling with the first lower holder, and the rod may be inserted in between the first groove and the second groove and held in the first holder.

In this case, the second holder may include a second lower holder including a third groove in which a portion of the pipe is inserted; and a second upper holder including a fourth groove in which another portion of the pipe is inserted, and coupling with the second lower holder, and the pipe may be inserted and held in between the third groove and the fourth groove.

Further, according to another embodiment of the disclosure, there is provided a tendon-sheath driving apparatus including: a sheath having a predetermined length, being flexible and having a hollow shape; a tendon placed inside a hollow of the sheath; a rod coupled to an outer surface of a first side of the tendon, and having higher rigidity than the sheath; a pipe coupled to an outer surface of a first side of the sheath, and having higher rigidity than the sheath; and an elastic unit provided inside the pipe, and configured to surround the tendon between the sheath and the rod to be partially filled in the pipe, wherein the tendon is moved through the sheath and the pipe as the rod is moved being guided by the pipe while a portion of the rod is placed inside the pipe.

In this case, the elastic unit may be formed to guide the tendon to move inside the pipe rectilinearly.

In this case, an outer diameter of the rod may be smaller than an inner diameter of the pipe.

In this case, an actuator may be provided to actuate the rod to move relative to the pipe.

In this case, the tendon-sheath driving apparatus may further include a first holder configured to hold the rod so that the rod can move relative to the pipe in a lengthwise direction; and a second holder configured to support the pipe, wherein the actuator actuates the first holder to move.

In this case, the first holder may include a first lower holder including a first groove in which a portion of the rod is inserted; and a first upper holder including a second groove in which another portion of the rod is inserted, and coupling with the first lower holder, and the rod may be inserted in between the first groove and the second groove and held in the first holder.

In this case, the second holder may include a second lower holder including a third groove in which a portion of the pipe is inserted; and a second upper holder including a fourth groove in which another portion of the pipe is inserted, and coupling with the second lower holder, and the pipe may be inserted and held in between the third groove and the fourth groove.

In this case, the sheath may be made of an elastic material, and the elastic unit may be made of the same material as the sheath.

In this case, the first holder may include a first-rod groove having a cylindrical shape corresponding to the rod; and a second rod groove having a radius greater than a radius of the first rod groove, the second holder may include a third pipe groove having a cylindrical shape corresponding to the pipe; and a fourth pipe groove having a radius greater than a radius of the third pipe groove, the rod may include a rod protrusion inserted in and fastened to the second groove, and the pipe may include a pipe protrusion inserted in and fastened to the fourth groove.

Further, according to still another embodiment of the disclosure, there is provided a tendon-sheath driving apparatus including: a sheath having a predetermined length, being flexible and having a hollow shape; a tendon placed inside a hollow of the sheath; a tendon pipe coupled to the tendon, inserting the sheath therein, and having higher rigidity than the sheath; and a sheath pipe inserting the sheath therein, and having higher rigidity than the sheath, wherein the tendon is moved through the sheath as the tendon pipe is moved being guided by the sheath pipe while a portion of the tendon pipe is placed inside the sheath pipe.

In this case, a portion of the sheath is guided and moved by the tendon pipe as the tendon pipe is moved being guided by the sheath pipe.

In this case, the outer diameter of the tendon pipe may be smaller than the inner diameter of the sheath pipe.

In this case, the outer diameter of the sheath may be smaller than the inner diameter of the tendon pipe.

In this case, the tendon-sheath driving apparatus may further include an actuator that actuates the tendon pipe to move relative to the sheath pipe.

In this case, the tendon-sheath driving apparatus may further include a first holder configured to hold the tendon pipe so that the tendon pipe can move relative to the sheath pipe in its lengthwise direction; and a second holder configured to support the sheath pipe, and the actuator may actuate the first holder to move.

In this case, the first holder may include a first lower holder including a first groove in which a portion of the tendon pipe is inserted; a first upper holder including a second groove in which another portion of the tendon pipe is inserted, and coupling with the first lower holder, and the tendon pipe may be inserted in between the first groove and the second groove and held in the first holder.

In this case, the second holder may include a second lower holder including a third groove in which a portion of the sheath pipe is inserted; and a second upper holder including a fourth groove in which another portion of the sheath pipe is inserted, and coupling with the second lower holder, and the sheath pipe may be inserted and held in between the third groove and the fourth groove.

In this case, a moving space in which the sheath is movable may be formed between the tendon and the tendon pipe.

In this case, the tendon-sheath driving apparatus may further include an elastic unit provided in the moving space, wherein the elastic unit surrounds the tendon.

A tendon-sheath driving apparatus according to an embodiment of the disclosure minimizes buckling between a tendon and a sheath as relative movement between the tendon and the sheath becomes smooth, thereby precisely actuating a robot.

DETAILED DESCRIPTION OF EMBODIMENTS

Figure 1:
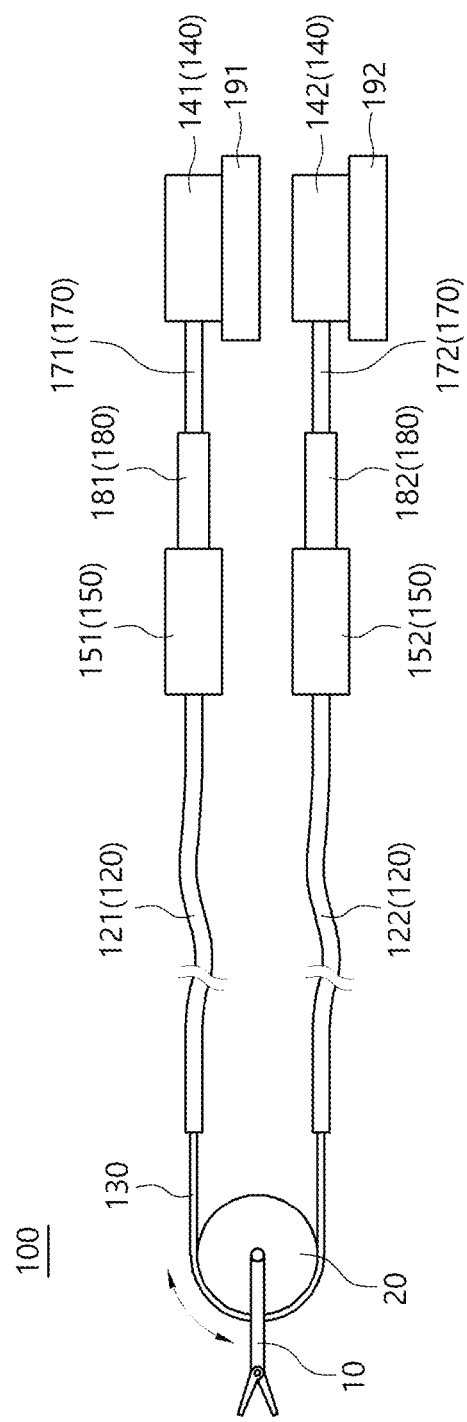
FIG. 1 is a perspective view schematically illustrating a tendon-sheath driving apparatus according to an embodiment of the disclosure.

Below, various embodiments of the disclosure will be described in more detail with reference to the accompanying drawings. The embodiments of the disclosure may be modified variously. Specific embodiments may be depicted in the drawings and concretely explained in the detailed description. However, specific embodiments disclosed in the accompanying drawings are merely intended to help understanding of various embodiments. Therefore, it is not intended to limit the technical idea to the specific embodiments disclosed in the accompanying drawings, and it should be understood to include all equivalents or substitutes included in the spirit and scope of the disclosure.

Terms such as first or second may be used to describe various elements, but the embodiments are not limited by these terms. The terms are only for the purpose of distinguishing one element from another element.

In the embodiments, it should be understood that term "include" or "have" indicates that a feature, a number, a step, an operation, an element, a part, or the combination thereof described in the embodiments is present, but does not exclude a possibility of presence or addition of one or more other features, numbers, steps, operations, elements, parts or combinations thereof, in advance. When an element is mentioned to be "connected" or "accessed" to another element, it may be directly connected to or accessed to that other element, but it is to be understood that other elements may exist in between. On the other hand, when an element is mentioned to be "directly connected" or "directly accessed" to another element, it should be understood that there is no other element in between.

Meanwhile, "a module" or "a unit, part or portion" for an element used in the embodiments of the disclosure performs at least one function or operation. In addition, the "module" or "unit, part or portion" may perform a function or operation by hardware, software, or a combination of hardware and software. Further, a plurality of "modules" or a plurality of "units, parts or portions" except for modules" or "units, parts or portions" that should be performed in specific hardware or is performed by at least one processor may be integrated into at least one module. Singular expressions used herein include plural expressions unless the context clearly dictates otherwise.

Besides, in the description of the disclosure, when it is determined that specific description about the related known functions or features may unnecessarily obscure the gist of the present disclosure, a detailed description thereof is abbreviated or omitted.

Figure 2:
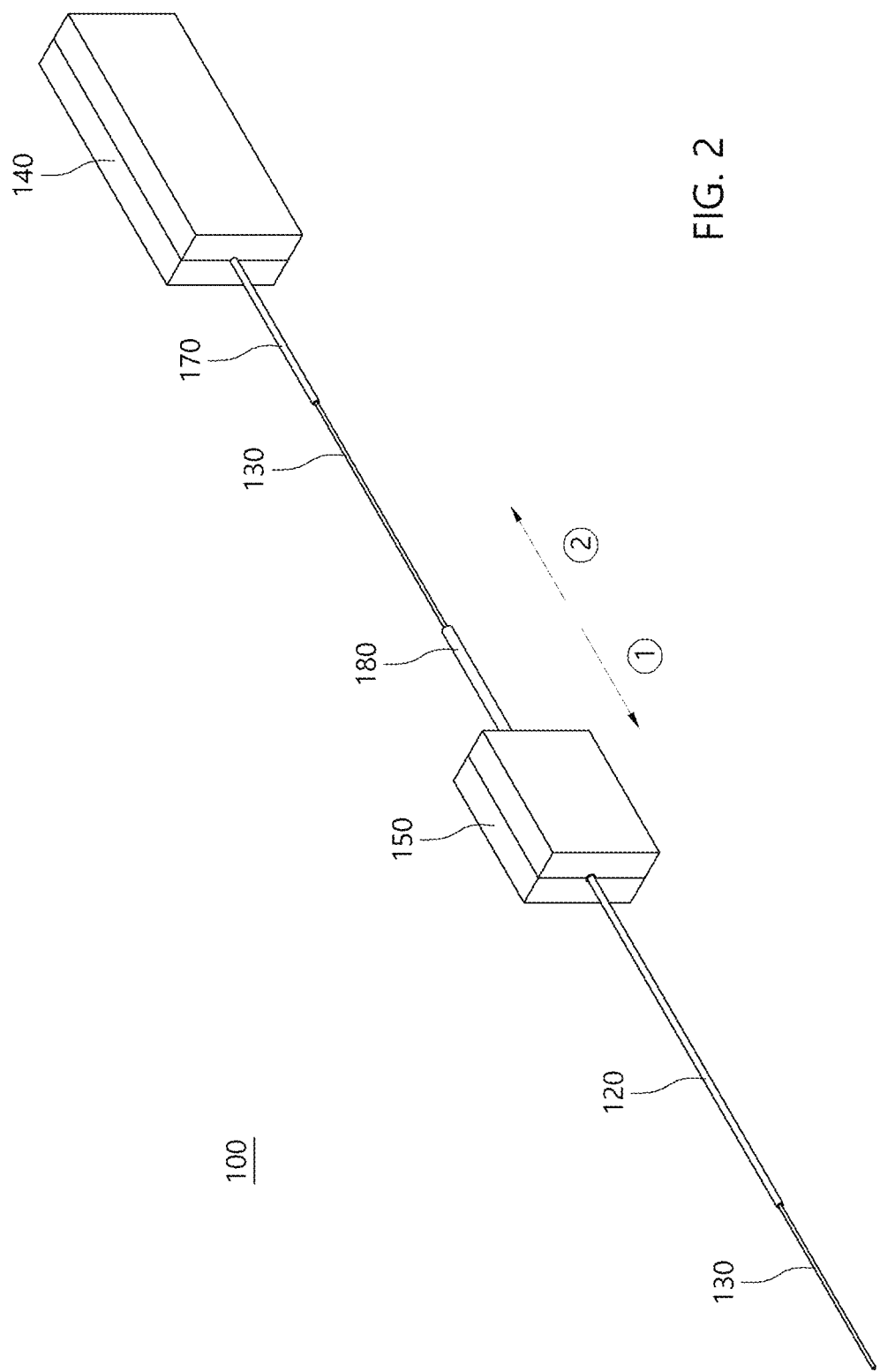
FIG. 2 is a perspective view illustrating that a rod and a pipe of FIG. 1 are separated.
Figure 3:
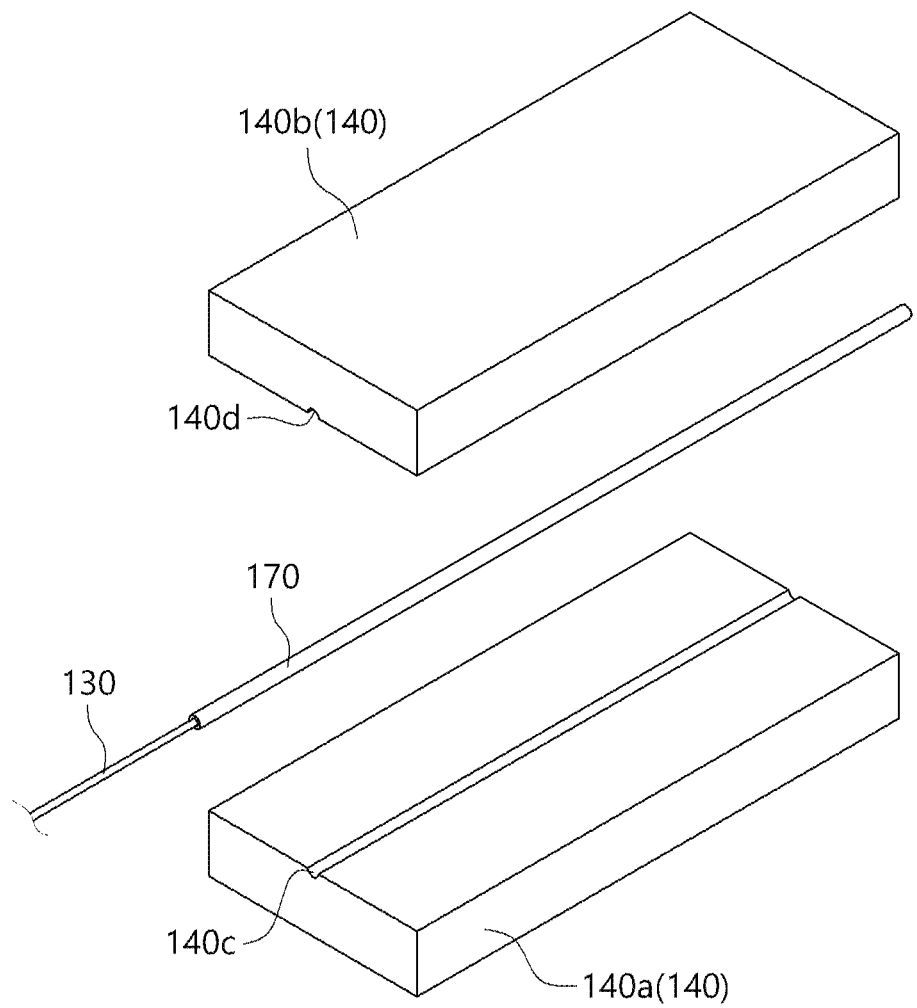
FIG. 3 is a perspective view illustrating that a first holder is separated into a first lower holder and a first upper holder in a tendon-sheath driving apparatus according to an embodiment of the disclosure.
Figure 4:
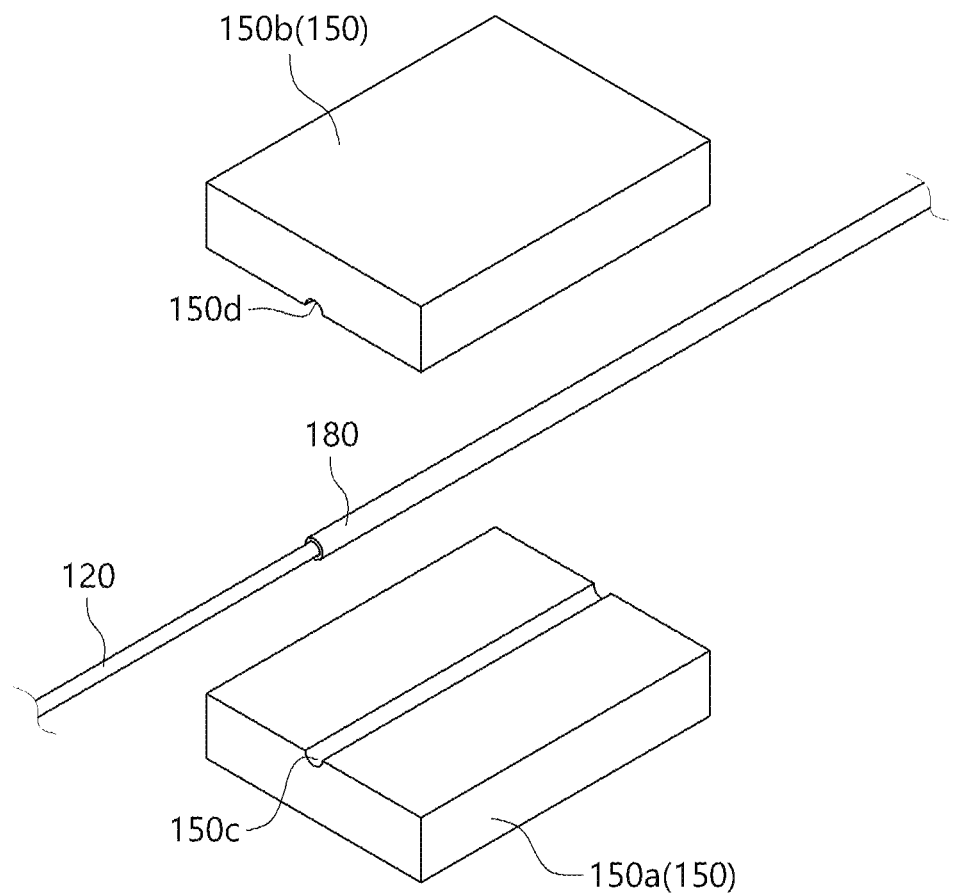
FIG. 4 is a perspective view illustrating that a second holder is separated into a second lower holder and a second upper holder in a tendon-sheath driving apparatus according to an embodiment of the disclosure.
Figure 5:
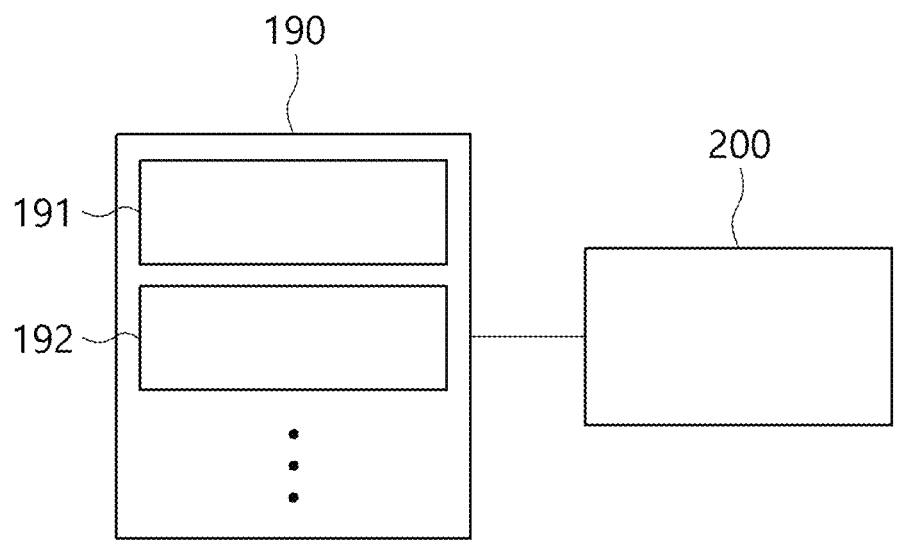
FIG. 5 is a block diagram of a tendon-sheath driving apparatus according to an embodiment of the disclosure.

FIG. 1 is a perspective view schematically illustrating a tendon-sheath driving apparatus according to an embodiment of the disclosure, FIG. 2 is a perspective view illustrating that a rod and a pipe of FIG. 1 are separated, FIG. 3 is a perspective view illustrating that a first holder is separated into a first lower holder and a first upper holder in a tendon-sheath driving apparatus according to an embodiment of the disclosure, FIG. 4 is a perspective view illustrating that a second holder is separated into a second lower holder and a second upper holder in a tendon-sheath driving apparatus according to an embodiment of the disclosure, and FIG. 5 is a block diagram of a tendon-sheath driving apparatus according to an embodiment of the disclosure.

As shown in FIG. 1, the tendon-sheath driving apparatus 100 according to an embodiment of the disclosure refers to an apparatus for actuating a robot 10 based on the relative movement between a tendon 130 and a sheath 120. In this case, the tendon is driven by alternating between a master role and a slave role. Here, the robot 10 refers to a medical robot that is inserted into a patient's body and performs an incision, a grip or the like operation, but is not limited to the medical robot.

Referring to FIGS. 1 to 5, the tendon-sheath driving apparatus 100 according to an embodiment of the disclosure includes a plurality of sheaths 120, a tendon 130, a plurality of rods 170, a plurality of pipes 180, a plurality of first holders 140, and a plurality of second holders 150.

The plurality of sheaths 120 is flexible, has a predetermined length, and is formed with a hollow shape. Further, the plurality of sheaths 120 may be made of flexible metal. Further, the plurality of sheaths 120 may be shaped like a coil. The plurality of sheaths 120 includes a first sheath 121 and a second sheath 122.

The tendon 130 is placed inside each hollow of the plurality of sheaths 120. In other words, the tendon 130 has a first side placed inside the first sheath 121, and a second side placed inside the second sheath 122. In this case, the length of the tendon 130 is greater than the total length of the plurality of sheaths 120. In addition, the tendon 130 is connected to a joint 20 of the robot to actuate the joint 20 of the robot. For example, the tendon 130 is wound around an outer circumferential surface of the joint 20 of the robot to rotate the joint 20 of the robot clockwise or counterclockwise.

Meanwhile, according to various embodiments of the disclosure, the first and second ends of the tendon 130 may not be necessarily connected continuously and formed as a single body. For instance, two separate tendons may be provided, and each end of two tendons may be fastened to the joint 20 of the robot so that movement can be made like that of a single tendon.

Meanwhile, according to various embodiments of the disclosure, the tendon 130 is not limited to the single tendon connected to the joint 20 of the robot, but may include two or more tendons. Likewise, the plurality of sheaths 120 may not be limited to two sheaths, but may include two, four, six, ten or more even numbers of sheets corresponding to the number of tendons 130. Like this, the tendon-sheath driving apparatus according to various embodiments of the disclosure may increase the degree of freedom of the robot based on the number of tendons 130.

The plurality of rods 170 is connected to the first side of the tendon 130.

Further, according to various embodiments of the disclosure, the plurality of rods 170 may be shaped like a hollow pipe. In this case, the tendon 130 is partially inserted in the plurality of rods 170, and then the plurality of rods 170 is compressed against the outer surface of the tendon 130. However, the plurality of rods 170 is not limited to being compressed and coupled to the outer surface of the tendon 130, but may be coupled to the tendon 130 in various ways.

The plurality of rods 170 is made of a material having higher rigidity than the plurality of sheaths 120. For example, the plurality of rods 170 may be made of metal. However, the plurality of rods 170 may not be limited to metal, but may be made of various materials having higher rigidity than the plurality of sheaths 120.

In addition, the plurality of rods 170 includes a first tendon rod 171 compressed against the outer surface of the first side of the tendon 130, and a second tendon rod 172 compressed against the outer surface of the second side of the tendon 130.

The plurality of pipes 180 are coupled to the first sides of the plurality of sheaths 120 in a row. For example, the plurality of pipes 180 are compressed against the outer surfaces of the first sides of the plurality of sheaths 120. However, the plurality of pipes 180 are not limited to being compressed and coupled to the outer surfaces of the first sides of the plurality of sheaths 120, but may be coupled to the sheaths 120 in various ways.

The plurality of pipes 180 accommodate therein the first sides of the plurality of rods 170, respectively. The plurality of pipes 180 is made of a material having higher rigidity than the plurality of sheaths 120. For example, the plurality of pipes 180 may be made of metal. However, the plurality of pipes 180 is not limited to metal, but may be made of various materials, the rigidity of which is higher than that of the plurality of sheaths 120.

In addition, the plurality of pipes 180 includes a first sheath pipe 181 coupled to the first side of the first sheath 121, and a second sheath pipe 182 coupled to the first side of the second sheath 122.

The first sheath pipe 181 accommodates therein the first side of the first tendon rod 171. In addition, the second sheath pipe 182 accommodates therein the first side of the second tendon rod 172. In this case, the plurality of pipes 180 guides the movement of the plurality of rods 170. Thus, the plurality of tendons 130 are prevented from being bent, i.e., buckling while moving through the plurality of sheaths 120.

The plurality of first holders 140 holds the plurality of rods 170. In this case, the plurality of first holders 140 includes a first tendon holder 141 coupling with the first tendon rod 171, and a second tendon holder 142 coupling with the second tendon rod 172.

In this case, the tendon-sheath driving apparatus 100 according to an embodiment of the disclosure includes a plurality of actuators 190 to rectilinearly move the plurality of first holders 140. For example, the plurality of actuators 190 may include a linear actuator, but is not limited thereto. Alternatively, the plurality of actuators 190 may include various devices as long as it can move the plurality of first holders 140 linearly.

The plurality of actuators 190 includes a first actuator 191 connected to the first tendon holder 141, and a second actuator 192 connected to the second tendon holder 142.

The first actuator 191 moves the first tendon holder 141 in a first direction ① or a second direction ② opposite to the first direction ①. Further, the second actuator 192 moves the second tendon holder 142 in the first direction ① or the second direction ② opposite to the first direction ①.

As the plurality of first holders 140 is moved by the actuator 190 in the first direction ① or the second direction ②, the plurality of rods 170 is moved in the first direction ① or the second direction ②. In addition, as the plurality of rods 170 is moved in the first direction ① or the second direction ②, the plurality of tendons 130 is moved in the first direction ① or the second direction ②.

Further, as shown in FIG. 3, the plurality of first holders 140 includes a first lower holder 140a, and a first upper holder 140b. The first lower holder 140a is formed with a first groove 140c in which a portion of the plurality of rods 170 is inserted. The first groove 140c may be shaped like a semi-cylinder. The first upper holder 140b and the first lower holder 140a are coupled to each other. The first upper holder 140b is formed with a second groove 140d in which the other portion of the plurality of rods 170 is inserted. The second groove 140d may be shaped like a semi-cylinder, and formed to face toward the first groove 140c. When the first lower holders 140a and the first upper holder 140b are coupled to each other, the first groove 140c and the second groove 140d are formed like a cylinder. In addition, the plurality of rods 170 are inserted between the first groove 140c and the second groove 140d and fastened to the plurality of first holders 140.

The plurality of second holders 150 respectively support the plurality of pipes 180 so that the plurality of rods 170 can move in a lengthwise direction with respect to the plurality of pipes 180.

Further, as shown in FIG. 4, the plurality of second holders 150 includes a second lower holder 150a, and the first upper holder 150b. The second lower holder 150a is formed with a third groove 150c in which a portion of the plurality of pipes 180 is inserted. The third groove 150c may be shaped like a semi-cylinder. The second upper holder 150b and the second lower holder 150a are coupled to each other. The second upper holder 150b is formed with a fourth groove 150d in which the other portion of the plurality of pipes 180 is inserted. The fourth groove 150d may be shaped like a semi-cylinder, and formed to face toward the third groove 150c. When the second lower holder 150a and the second upper holder 150b are coupled to each other, the third groove 150c and the fourth groove 150d are formed like a cylinder. In addition, the plurality of pipes 180 are inserted between the third groove 150c and the fourth groove 150d and fastened to the plurality of second holders 150.

In addition, the plurality of second holders 150 includes a first sheath holder 151 to hold the first sheath pipe 181, and a second sheath holder 152 to hold the second sheath pipe 182. Further, as shown in FIG. 5, the tendon-sheath driving apparatus 100 includes a controller 200 to control the plurality of actuators 190.

The controller 200 controls the first actuator 191 and the second actuator 192 to simultaneously move the first tendon holder 141 and the second tendon holder 142. For example, when the controller 200 controls the first tendon holder 141 to move in the first direction ①, the controller 200 controls the second tendon holder 142 to move in the second direction ② opposite to the moving direction of the first tendon holder 141. As the first tendon holder 141 and the second tendon holder 142 are moved, the tendon 130 makes the joint 20 of the robot be rotated clockwise or counterclockwise.

Figure 6:
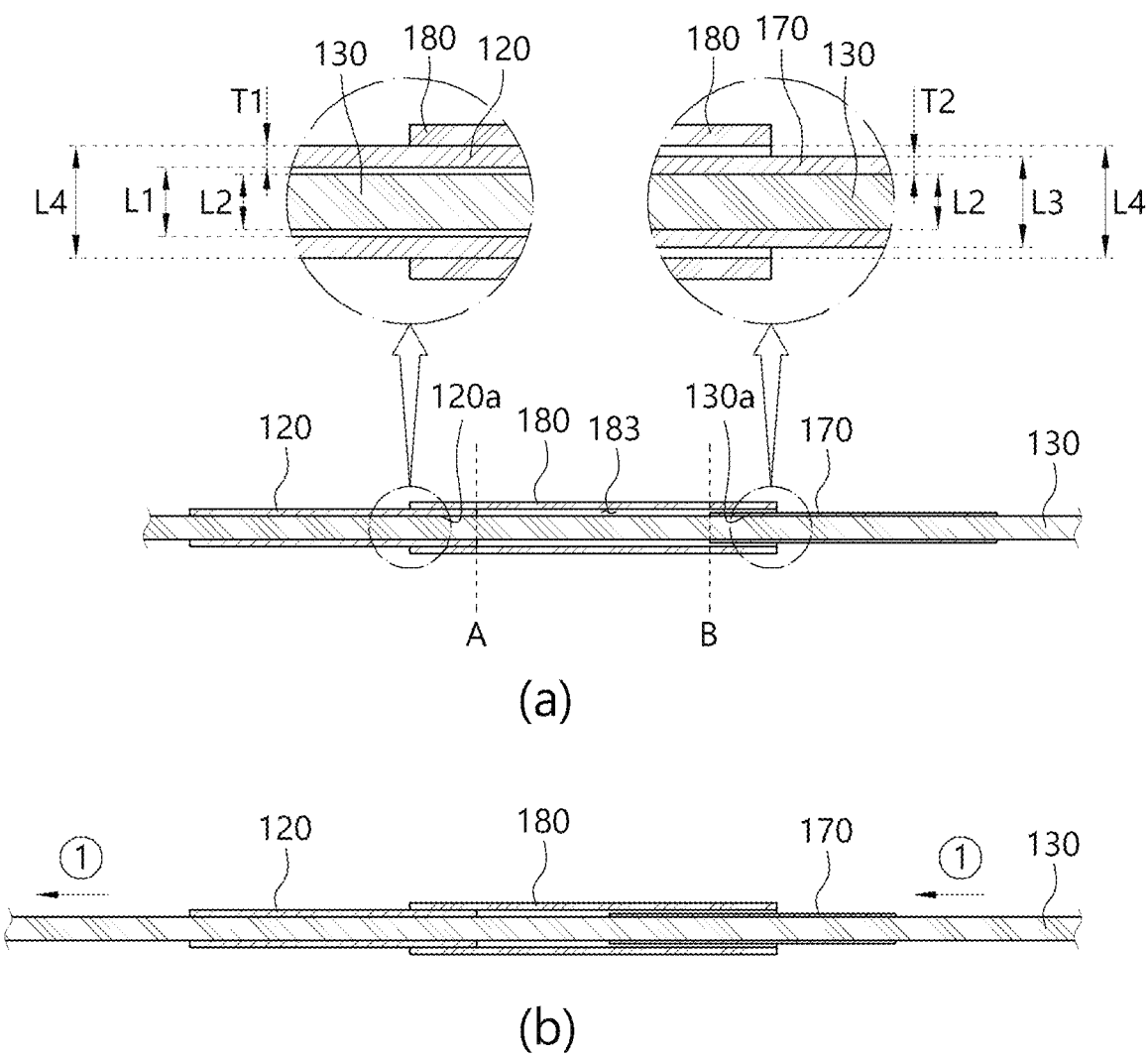
FIG. 6 is a diagram illustrating relative movement between a tendon and a sheath in a tendon-sheath driving apparatus according to an embodiment of the disclosure.

FIG. 6 is a diagram illustrating relative movement between a tendon and a sheath in a tendon-sheath driving apparatus according to an embodiment of the disclosure.

First, referring to (a) in FIG. 6, the inner diameter L1 of the sheath 120 is greater than the outer diameter L2 of the tendon 130. In this case, the pipe 180 is coupled to a coupling portion 120a of the sheath 120, and the inner diameter L4 of the pipe 180 is equal to the outer diameter of the sheath 120. However, the inner diameter L4 of the pipe 180 is not limited to being equal to the outer diameter of the sheath 120, and the inner diameter L4 of the pipe 180 may be greater than the outer diameter of the sheath 120.

In addition, the outer diameter L3 of the rod 170 is smaller than the inner diameter L4 of the pipe 180. Thus, the rod 170 moves being guided by the pipe 180. In this case, the thickness T2 of the rod 170 is smaller than the thickness T1 of the sheath 120. Thus, the pipe 180 is fastened to the sheath 120 and guides the rod 170 to move.

In addition, as shown in (a) of FIG. 6, the tendon 130 is inserted in the sheath 120. In addition, the rod 170 is coupled to a coupling portion 130a of the tendon 130. In this case, the rod 170 is partially inserted into the pipe 180. In this case, a moving space 183 is formed between the tendon 130 and the pipe 180 so as to allow the rod 170 to move. In addition, one end of the rod 170 is positioned at a first position B. Here, the first position B refers to a position at which the rod 170 is partially inserted into the pipe 180 and maximally spaced apart from the sheath 120.

Further, the difference between the inner diameter L4 of the pipe 180 and the outer diameter L2 of the tendon 130 is minimized to prevent buckling when the tendon 130 moves in the moving space 183.

In addition, as shown in (b) of FIG. 6, when the tendon 130 moves in the first direction ①, the rod 170 moves toward a second position A along with the moving space 183 while being coupled to the tendon 130. Here, the distance between the first position B and the second position A may approximately range from 10 mm to 20 mm. Thus, a portion of the tendon 130, the rigidity of which is maintained by the rod 170, is smoothly inserted into the sheath 120. In addition, the tendon 130 placed between the sheath 120 and the rod 170 is guided by the pipe 180, and the tendon 130 is smoothly inserted into the sheath 120. Thus, the tendon 130 is prevented from bending, i.e., buckling while inserted into the sheath 120.

Figure 7:
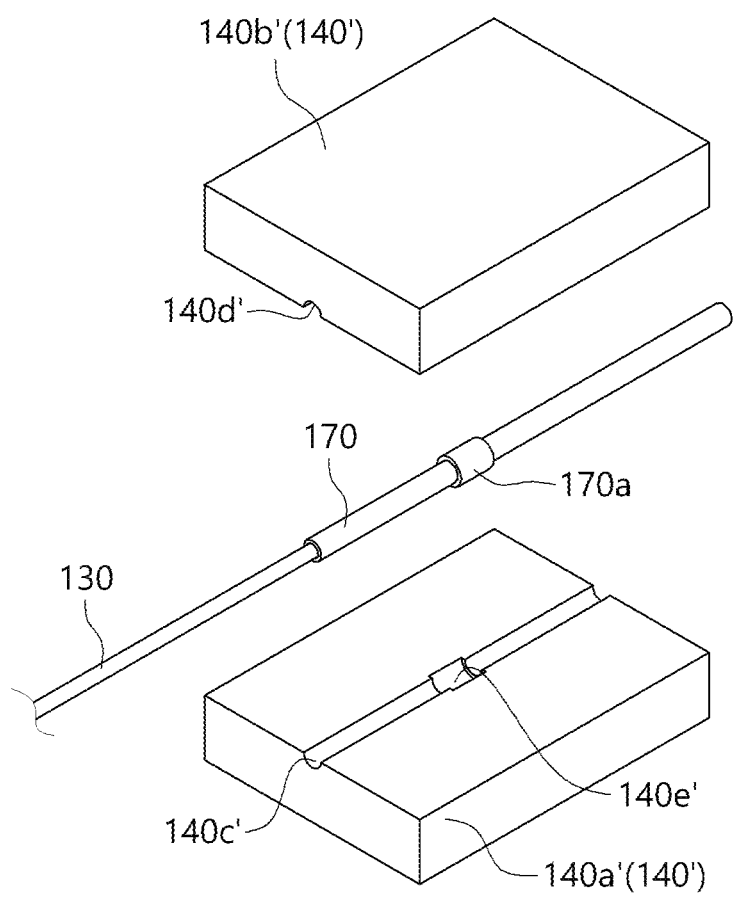
FIG. 7 is a diagram illustrating an alternative example of a first holder.

FIG. 7 is a diagram illustrating an alternative example of a first holder.

As shown in FIG. 7, a protrusion 170a is formed on the outer surface of the rod 170.

The protrusion 170a has a cylindrical shape. The protrusion 170a is fastened to the outer surface of the rod 170. Further, the outer surface of the rod 170 may be formed with an accommodating groove in which the protrusion 170a is partially accommodated.

Further, according to various embodiments of the disclosure, the protrusion 170a is not limited to the cylindrical shape, but may have various shapes such as a rectangular box.

A first holder 140' is formed with a first groove 140c' in which a portion of the rod 170 is inserted.

In this case, the first groove 140c' includes a first protrusion groove 140e' in which a portion of the protrusion 170a is inserted. For example, the first protrusion groove 140e' is shaped like a semi-cylinder corresponding to the first protrusion 170a having a cylindrical shape. However, the first protrusion groove 140e' is not limited to the semicylindrical shape, but may be shaped corresponding to various shapes of the first protrusion 170a.

In addition, the protrusion 170a is inserted in and fastened to the first protrusion groove 140e'. Thus, the first holder 140' more firmly holds the rod 170.

Further, the tendon-sheath driving apparatus according to various embodiments of the disclosure is not limited to the structure where the first protrusion 170a is inserted in the first protrusion groove 140e', but may have various coupling structures for coupling the first holder 140' and the rod 170.

Meanwhile, according to various embodiments of the disclosure, a second protrusion is formed on the outer surface of the pipe 180 (see FIG. 4).

The second protrusion has a cylindrical shape. The second protrusion is fastened to the outer surface of the pipe 180. Further, according to various embodiments of the disclosure, the second protrusion is not limited to the cylindrical shape, but may have various shapes such as a rectangular box.

In this case, the second groove 150c (see FIG. 4) includes a second protrusion groove in which a portion of the second protrusion is inserted. For example, the second protrusion groove may be shaped like a semi-cylinder to correspond to the second protrusion having a cylindrical shape. However, the second protrusion groove is not limited to the semicylindrical shape, but may be shaped corresponding to the second protrusion having various shapes.

In addition, the second protrusion is inserted in and fastened to the second protrusion groove. Thus, the second holder 150 more firmly holds the pipe 180.

Further, the tendon-sheath driving apparatus according to various embodiments of the disclosure is not limited to a structure where the second protrusion is inserted in the second protrusion groove, but may have various coupling structures for coupling the second holder 150 and the pipe 180.

Figure 8:
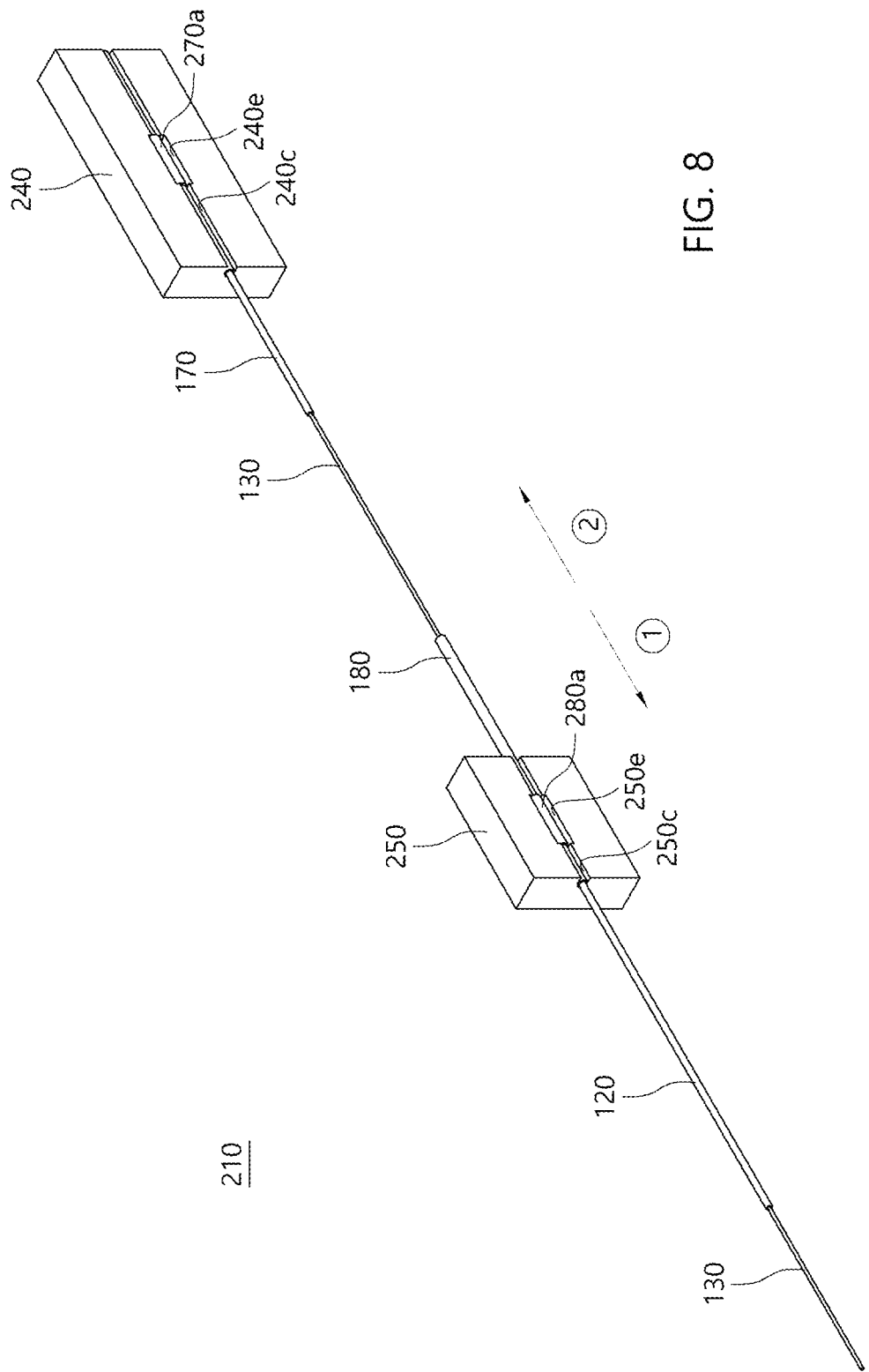
FIG. 8 is a diagram illustrating a tendon-sheath driving apparatus according to another embodiment of the disclosure.

FIG. 8 is a diagram illustrating a tendon-sheath driving apparatus according to another embodiment of the disclosure.

Referring to FIG. 8, a tendon-sheath driving apparatus 210 according to another embodiment of the disclosure includes the plurality of sheaths 120, the tendon 130, the plurality of rods 170, the plurality of pipes 180, a plurality of first holders 240, and a plurality of second holders 250. Below, descriptions will be made focusing on the first holder 240 and the second holder 250 by replacing the descriptions about the same or similar elements to those of the foregoing embodiment with the foregoing descriptions.

Unlike the first holder according to the foregoing embodiment, the first holder 240 is provided as a single body without being separated into the first lower holder and the first upper holder.

The first holder 240 includes a first rod groove 240c shaped like a cylinder corresponding to the rod 170, and a second rod groove 240e of which the radius is greater than the radius of the first rod groove 240c.

In this case, the first rod groove 240c and the second rod groove 240e are opened at the first side of the first holder 240 in a direction perpendicular to the lengthwise direction of the rod 170. Thus, the rod 170 is improved in convenience of a process of being inserted in the first rod groove 240c and the second rod groove 240e.

In addition, the rod 170 is provided with a rod protrusion 270a corresponding to the second rod groove 240e. As the rod protrusion 270a is inserted in and fastened to the second rod groove 240e, the rod 170 is stably held in the first holder 240.

Unlike the second holder of the foregoing embodiment, the second holder 250 is provided as a single body without being separated into the second lower holder and the second upper holder.

The second holder 250 includes a second pipe groove 250c shaped like a cylinder corresponding to the pipe 180, and a second pipe groove 250e, of which the radius is greater than the radius of the first pipe groove 250c.

In this case, the first pipe groove 250c and the second pipe groove 250e are opened at the first side of the second holder 250 in a direction perpendicular to the lengthwise direction of the pipe 180. Thus, the pipe 180 is improved by the convenience of the process of being inserted in the first pipe groove 250c and the second pipe groove 250e.

In addition, the pipe 180 is provided with a pipe protrusion 280a corresponding to the second pipe groove 250e. As the pipe protrusion 280a is inserted in and fastened to the second pipe groove 250e, the pipe 180 is stably held in the second holder 250.

Figure 9:
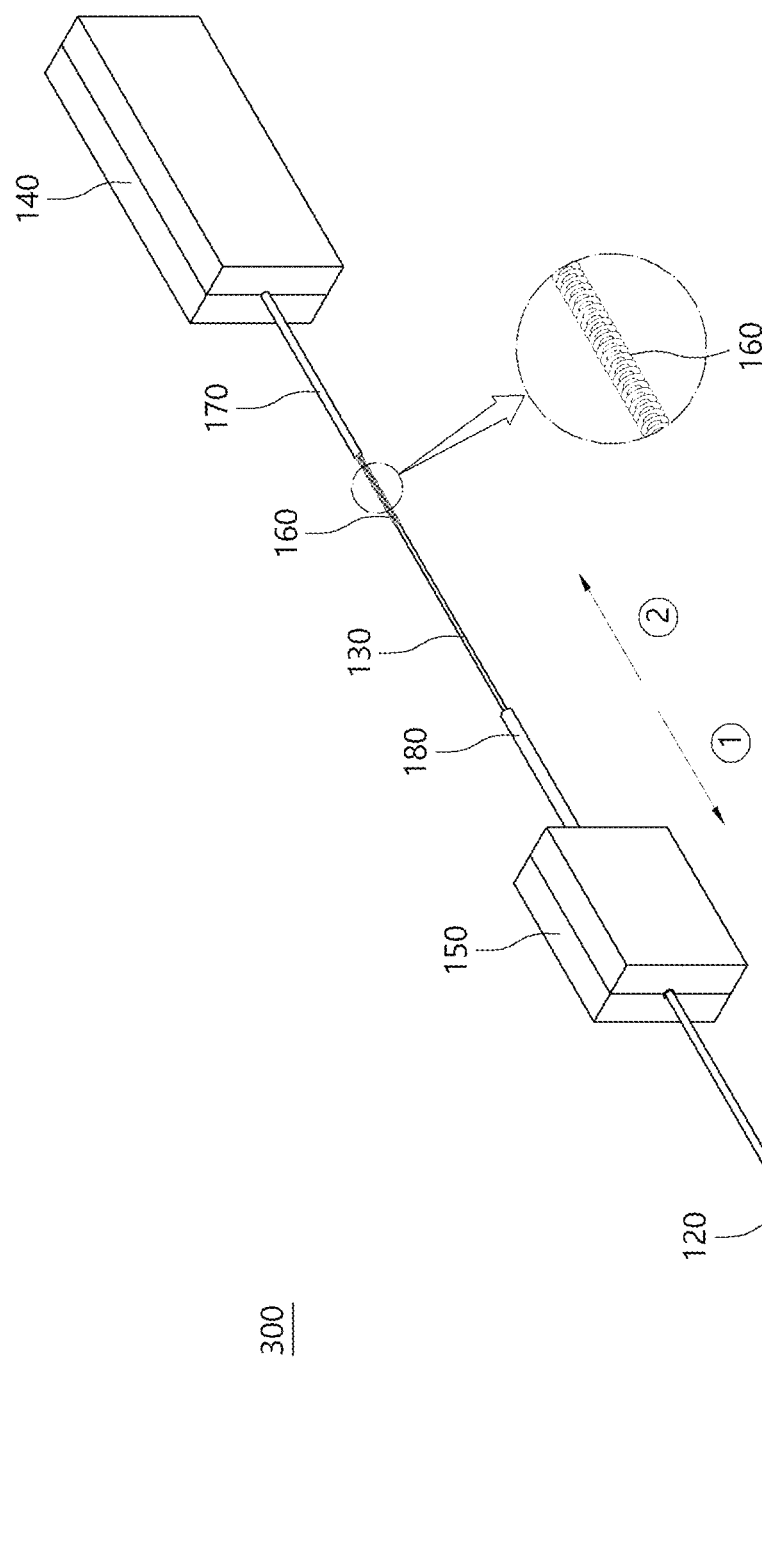
FIG. 9 is a perspective view illustrating that a rod and a pipe are separated in a tendon-sheath driving apparatus according to still another embodiment of the disclosure.

FIG. 9 is a perspective view illustrating that a rod and a pipe are separated in a tendon-sheath driving apparatus according to still another embodiment of the disclosure.

Referring to FIGS. 1 and 9, the tendon-sheath driving apparatus 100 according to still another embodiment of the disclosure includes the plurality of sheaths 120, the tendon 130, the plurality of rods 170, the plurality of pipes 180, the plurality of first holders 140, the plurality of second holders 150, and an elastic unit 160. Below, descriptions will be made focusing on the elastic unit 160 by replacing the descriptions about the same or similar elements to those of the foregoing embodiment with the foregoing descriptions.

The elastic unit 160 is provided inside the pipe 180, and surrounds the tendon 130 between the sheath 120 and the rod 170. In this case, the elastic unit 160 is provided in the form of a spring. However, the elastic unit 160 is not limited to the spring, but may have various forms as long as it is made of an elastic material and capable of surrounding the tendon 130. As the tendon 130 is moved by the rod 170, the elastic unit 160 is partially filled in the pipe 180 between the sheath 120 and the rod 170, thereby preventing the tendon 130 from buckling inside the pipe 180.

Figure 10:
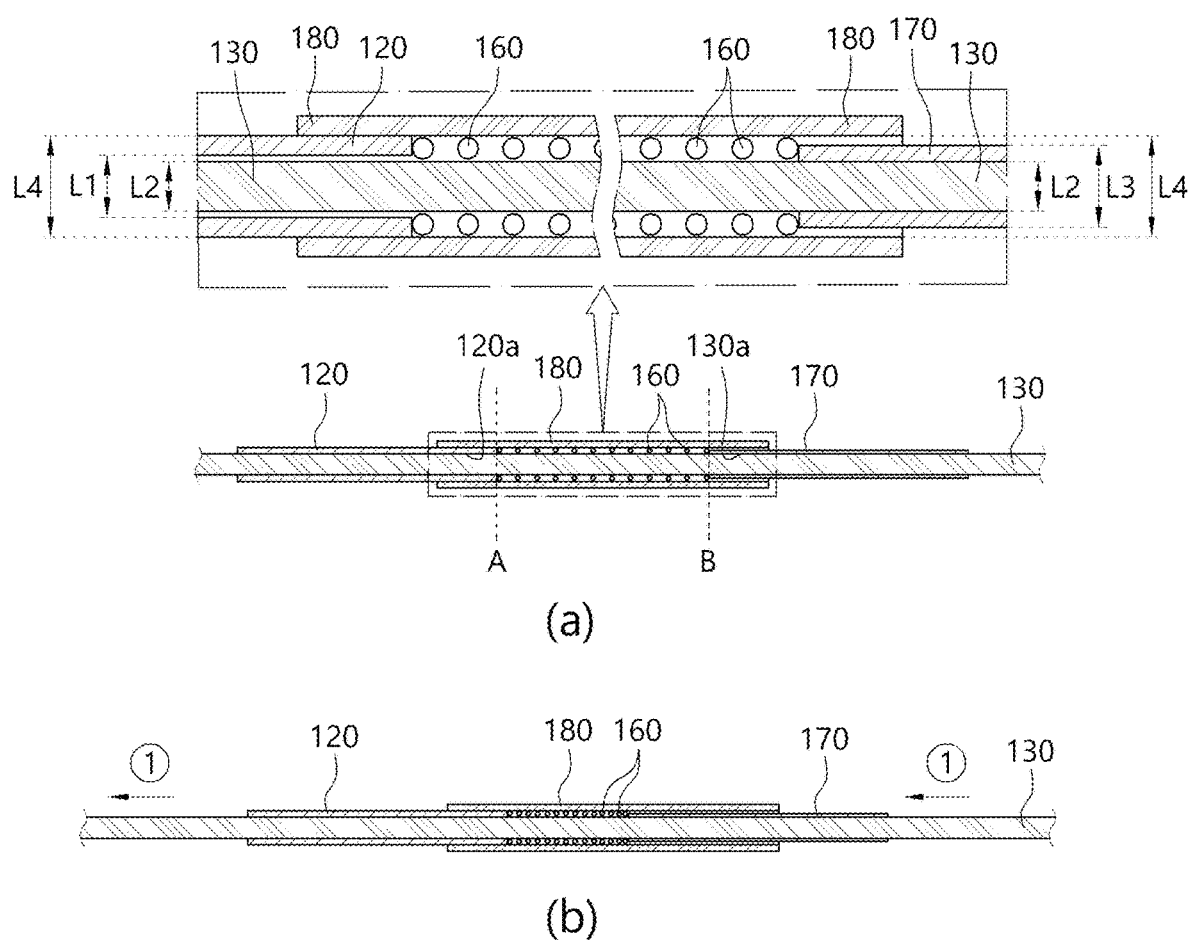
FIG. 10 is a diagram illustrating relative movement between a tendon and a sheath in a tendon-sheath driving apparatus according to still another embodiment of the disclosure.

FIG. 10 is a diagram illustrating relative movement between a tendon and a sheath in a tendon-sheath driving apparatus according to still another embodiment of the disclosure.

First, referring to (a) in FIG. 10, the inner diameter L1 of the sheath 120 is greater than the outer diameter L2 of the tendon 130. In this case, the pipe 180 is coupled to the coupling portion 120a of the sheath 120, and the inner diameter L4 of the pipe 180 is equal to the outer diameter of the sheath 120. However, the inner diameter L4 of the pipe 180 is not limited to being equal to the outer diameter of the sheath 120, but may be greater than the outer diameter of the sheath 120.

In addition, the outer diameter L3 of the rod 170 is smaller than the inner diameter L4 of the pipe 180. Thus, the rod 170 is moved by being guided by the pipe 180. In addition, as shown in (a) in FIG. 10, the tendon 130 is inserted in the sheath 120. In addition, the rod 170 is coupled to the coupling portion 130a of the tendon 130. In this case, a portion of the rod 170 is inserted into the pipe 180. In addition, one end of the rod 170 is positioned at the first position B inside the pipe 180, and one end of the sheath 120 is positioned at the second position A inside the pipe 180. Here, the first position B refers to a position at which the rod 170 is partially inserted in the pipe 180 and maximally spaced apart from one end of the sheath 120.

Further, the difference between the inner diameter L4 of the pipe 180 and the outer diameter L2 of the tendon 130 is minimized to prevent the tendon 130 from buckling when the tendon 130 moves in the moving space 183.

In addition, as shown in (b) of FIG. 10, when the tendon 130 moves in the first direction ①, the rod 170 moves toward the second position A along with the moving space 183 while being coupled to the tendon 130. Here, the distance between the first position B and the second position A may approximately range from 10 mm to 20 mm. Thus, a portion of the tendon 130, the rigidity of which is maintained by the rod 170, is smoothly inserted into the sheath 120. In addition, the tendon 130 placed between the sheath 120 and the rod 170 is guided to rectilinearly move by the elastic unit 160 without being in contact with the inner surface of the pipe 180, and the tendon 130 is smoothly inserted into the sheath 120. Thus, the tendon 130 is prevented from bending, i.e., buckling while inserted into the sheath 120.

Figure 11:
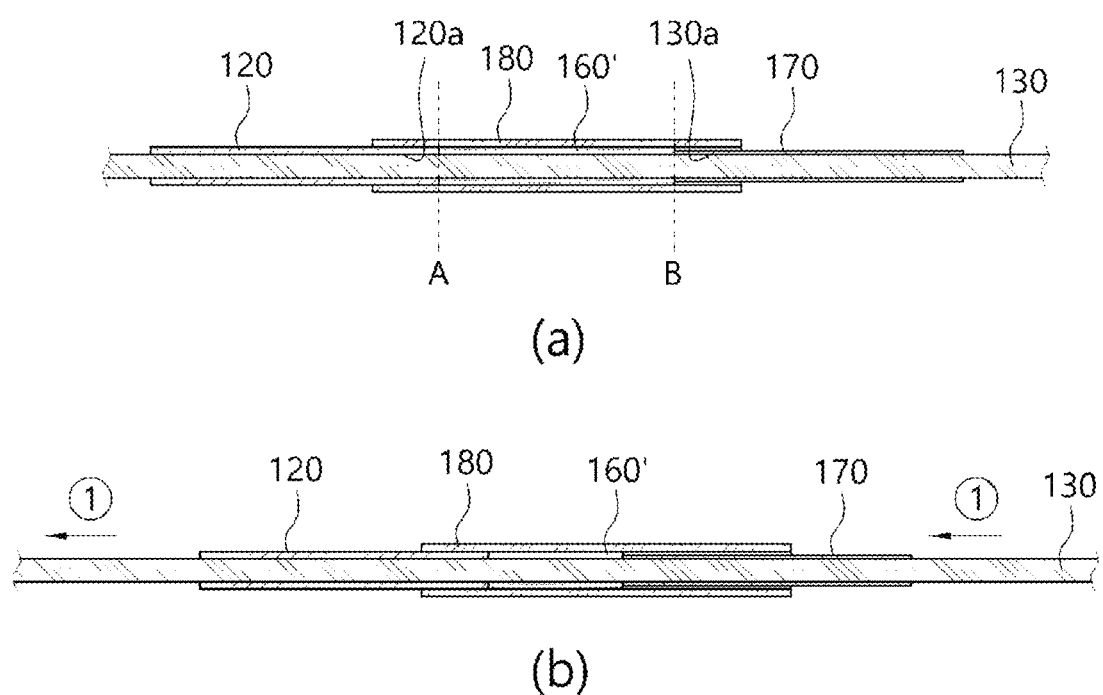
FIG. 11 is a diagram illustrating an alternative example of an elastic unit.

FIG. 11 is a diagram illustrating an alternative example of an elastic unit.

As shown in (a) of FIG. 11, an elastic unit 160' is shaped like not the spring but a tube, and made of an elastic material.

The elastic unit 160' may come into contact with or separate from one end of the sheath 120 inside the pipe 180.

As shown in (b) of FIG. 11, when the tendon 130 is moved by the rod 170 in the first direction ①, the tendon 130 is guided by the elastic unit 160' to move rectilinearly without being in contact with the inner surface of the pipe 180, and thus smoothly inserted in the sheath 120. Thus, the tendon 130 is prevented from being bent, i.e., buckling while being inserted in the sheath 120.

Further, according to various embodiments of the disclosure, the sheath 120 may be made of an elastic material, and the elastic unit 160' may be made of the same material as the sheath 120.

Further, according to various embodiments of the disclosure, the sheath 120 may be made of an elastic material, and the elastic unit 160' may be provided as a portion of the sheath 120.

Figure 12:
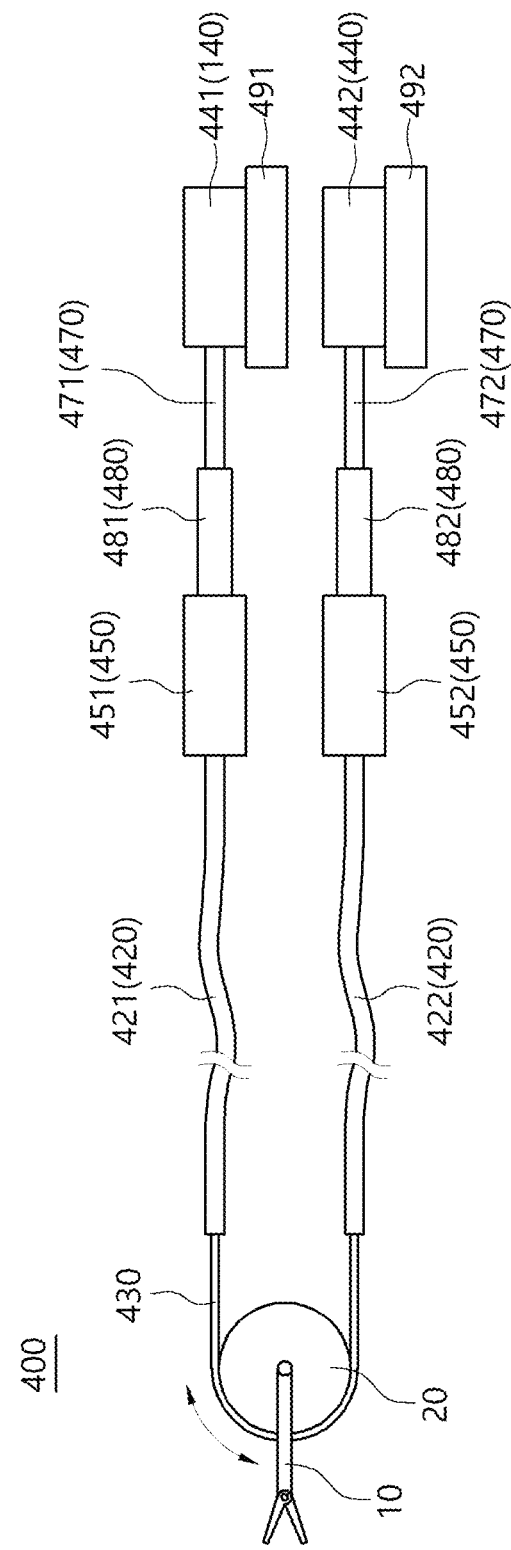
FIG. 12 is a perspective view schematically illustrating a tendon-sheath driving apparatus according to an embodiment of the disclosure.
Figure 13:
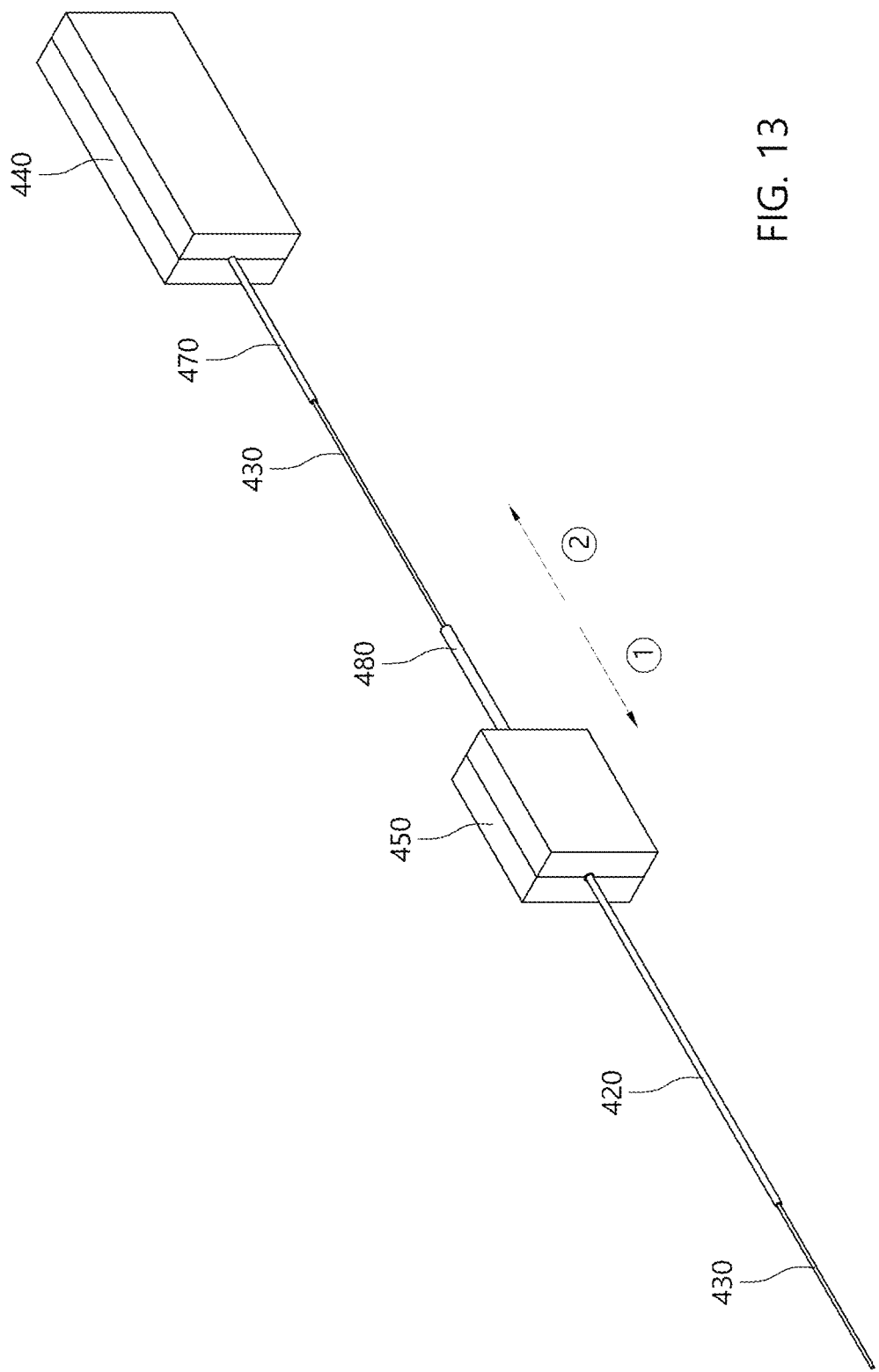
FIG. 13 is a perspective view illustrating that a tendon pipe and a sheath pipe of FIG. 12 are separated.
Figure 14:
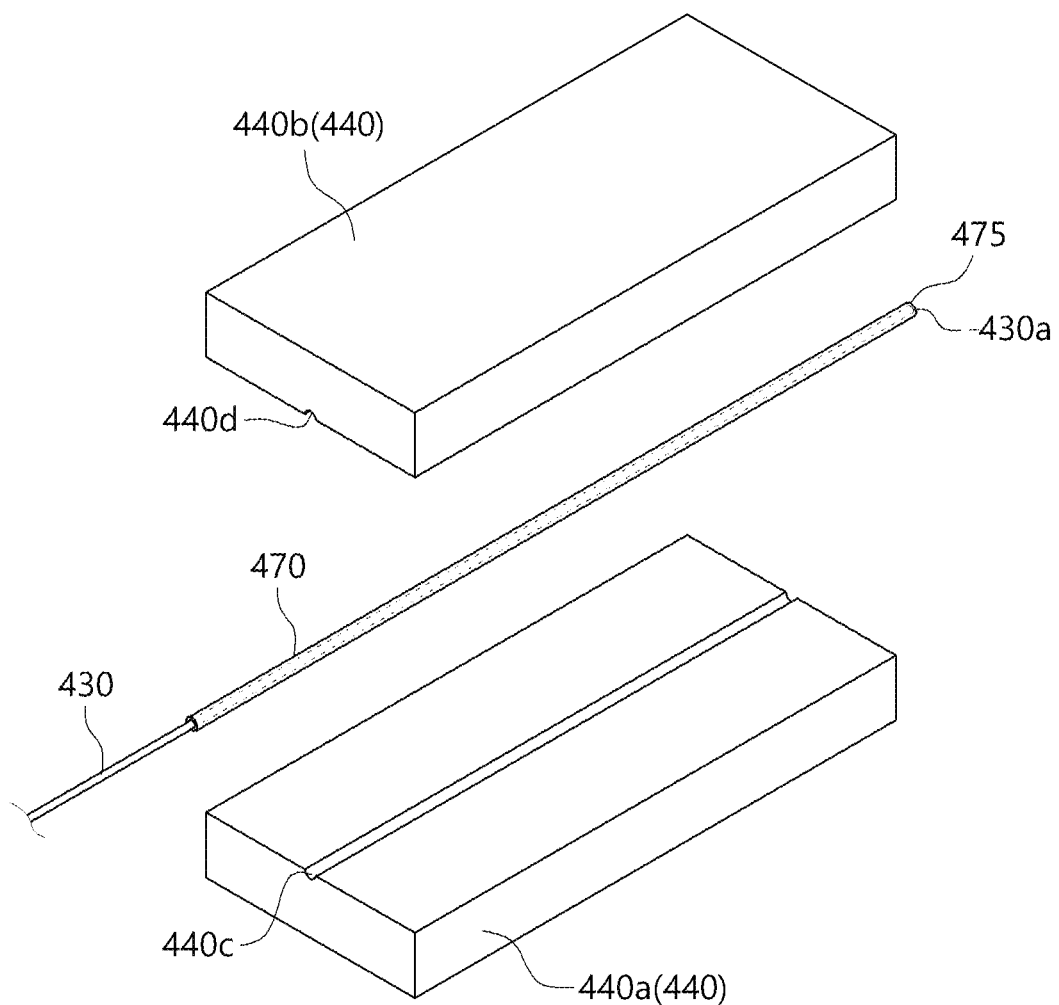
FIG. 14 is a perspective view illustrating that a first holder is separated into a first lower holder and a first upper holder in a tendon-sheath driving apparatus according to still another embodiment of the disclosure.
Figure 15:
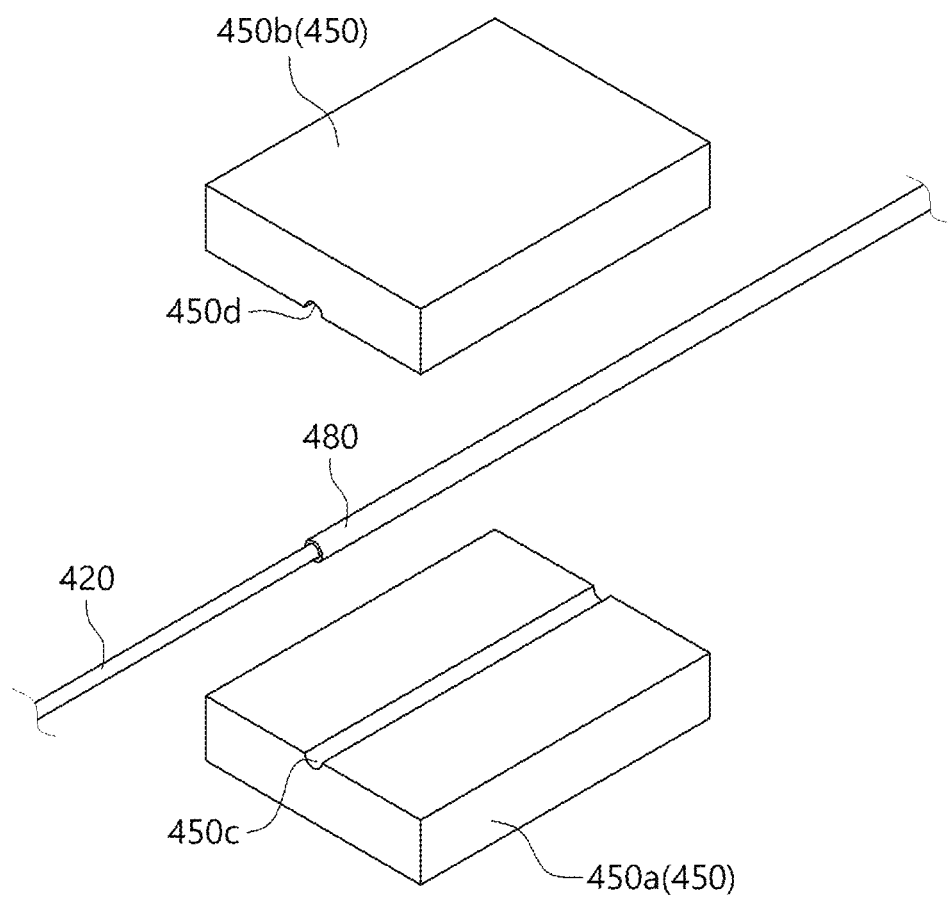
FIG. 15 is a perspective view illustrating that a second holder is separated into a second lower holder and a second upper holder in a tendon-sheath driving apparatus according to still another embodiment of the disclosure.
Figure 16:
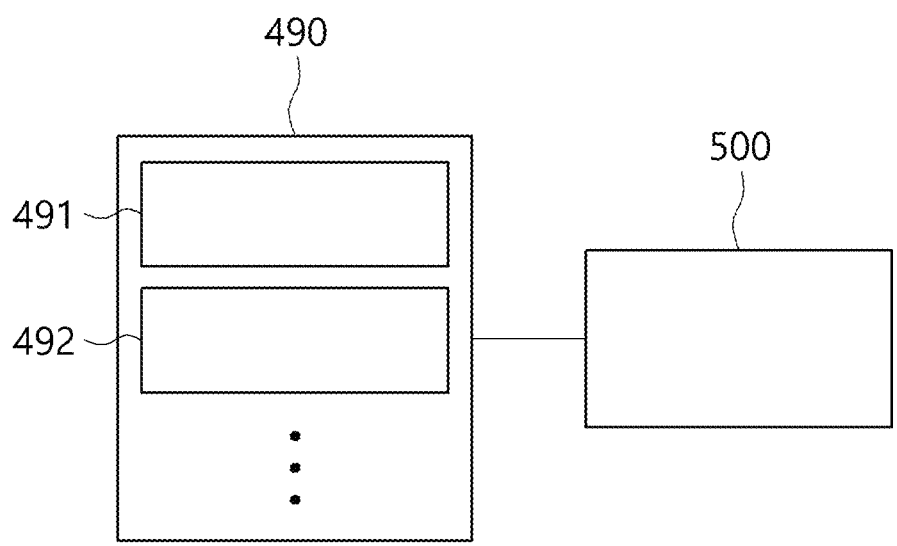
FIG. 16 is a block diagram of a tendon-sheath driving apparatus according to still another embodiment of the disclosure.

FIG. 12 is a perspective view schematically illustrating a tendon-sheath driving apparatus according to an embodiment of the disclosure, FIG. 13 is a perspective view illustrating that a tendon pipe and a sheath pipe of FIG. 12 are separated, FIG. 14 is a perspective view illustrating that a first holder is separated into a first lower holder and a first upper holder in a tendon-sheath driving apparatus according to still another embodiment of the disclosure, FIG. 15 is a perspective view illustrating that a second holder is separated into a second lower holder and a second upper holder in a tendon-sheath driving apparatus according to still another embodiment of the disclosure, and FIG. 16 is a block diagram of a tendon-sheath driving apparatus according to still another embodiment of the disclosure.

As shown in FIG. 12, a tendon-sheath driving apparatus 400 according to an embodiment of the disclosure refers to an apparatus for actuating a robot 10 based on the relative movement between a tendon 430 and a sheath 420. In this case, the tendon is driven by alternating between a master role and a slave role. Here, the robot 10 refers to a medical robot that is inserted into a patient's body and performs an incision, a grip or the like operation, but is not limited to the medical robot.

Referring to FIGS. 12 to 16, the tendon-sheath driving apparatus 400 according to still another embodiment of the disclosure includes a plurality of sheaths 420, a tendon 430, a plurality of tendon pipes 470, a plurality of sheath pipes 480, an elastic unit 460, a plurality of first holders 440, and a plurality of second holders 450.

The plurality of sheaths 420 is flexible, with a predetermined length, and formed with a hollow shape. Further, the plurality of sheaths 420 may be made of flexible metal. Further, the plurality of sheaths 420 may be shaped like a coil. The plurality of sheaths 420 includes a first sheath 421 and a second sheath 422.

The tendon 430 is placed inside each hollow of the plurality of sheaths 420. In other words, the tendon 430 has a first side placed inside the first sheath 421, and a second side placed inside the second sheath 422. In this case, the length of the tendon 430 is greater than the total length of the plurality of sheaths 420. In addition, the tendon 430 is connected to a joint 20 of the robot to actuate the joint 20 of the robot. For example, the tendon 430 is wound around an outer circumferential surface of the joint 20 of the robot to rotate the joint 20 of the robot clockwise or counterclockwise.

Meanwhile, according to various embodiments of the disclosure, the first and second ends of the tendon 430 may not be necessarily connected continuously and formed as a single body. For instance, two separate tendons may be provided, and each end of two tendons may be fastened to the joint 20 of the robot so that movement can be made like that of a single tendon.

Meanwhile, according to various embodiments of the disclosure, the tendon 430 is not limited to the single tendon connected to the joint 20 of the robot, but may include two or more tendons. Likewise, the plurality of sheaths 420 may not be limited to two sheaths, but may include two, four, six, ten or more even numbers of sheets corresponding to the number of tendons 430. Thus, the tendon-sheath driving apparatus according to various embodiments of the disclosure may increase the degree of freedom of the robot based on the number of tendons 430.

As shown in FIG. 14, the plurality of tendon pipes 470 includes a coupling portion 475 to couple with a first side 430a of the tendon 430.

In addition, the plurality of tendon pipes 470 accommodates therein a portion of the sheath 420.

Further, the plurality of tendon pipes 470 is made of a material having higher rigidity than the plurality of sheaths 420. For example, the plurality of tendon pipes 470 may be made of metal. However, the plurality of tendon pipes 470 is not limited to being made of metal, but may be made of various materials having higher rigidity than the plurality of sheaths 420.

In addition, the plurality of tendon pipes 470 includes a first tendon pipe 471 connecting with a portion of the tendon 430, and a second tendon pipe 472 connecting with the other portion of the tendon 430.

The plurality of sheath pipes 480 accommodate the sheath 420 and the tendon pipe 470. Thus, the tendon 430 is moved inside the sheath pipe 480 as guided by the sheath 420 and the tendon pipe 470, and thus prevented from buckling inside the sheath pipe 480.

In addition, the plurality of sheath pipes 480 is made of a material having higher rigidity than the plurality of sheaths 420. For example, the plurality of sheath pipes 480 may be made of metal. However, the plurality of sheath pipes 480 is not limited to being made of metal, but may be made of various materials having higher rigidity than the plurality of sheaths 420.

In addition, the plurality of sheath pipes 480 includes a first sheath pipe 481 in which the first sheath 421 is inserted, and a second sheath pipe 482 in which the second sheath 422 is inserted.

The first sheath pipe 481 accommodates therein the first side of the first tendon pipe 471. In addition, the second sheath pipe 482 accommodates therein the first side of the second tendon pipe 472. In this case, the plurality of sheath pipes 480 guides the movement of the plurality of tendon pipes 470. Thus, the plurality of tendons 430 are prevented from being bent, i.e., buckling while moving through the plurality of sheaths 420.

The plurality of first holders 440 holds the plurality of tendon pipes 470. In this case, the plurality of first holders 440 includes a first tendon holder 141 coupling with the first tendon pipe 471, and a second tendon holder 142 coupling with the second tendon pipe 472.

In this case, the tendon-sheath driving apparatus 400 according to still another embodiment of the disclosure includes a plurality of actuators 490 to move the plurality of first holders 440 rectilinearly. For example, the plurality of actuators 490 may include a linear actuator, but is not limited thereto. Alternatively, the plurality of actuators 490 may include various devices as long as it can move the plurality of first holders 440 linearly.

The plurality of actuators 490 includes a first actuator 491 connected to the first tendon holder 441, and a second actuator 492 connected to the second tendon holder 442.

The first actuator 491 moves the first tendon holder 441 in a first direction ① or a second direction ② opposite to the first direction ①. Further, the second actuator 492 moves the second tendon holder 442 in the first direction ① or the second direction ② opposite to the first direction ②.

As the plurality of first holders 440 is moved by the actuator 190 in the first direction ① or the second direction ②, the plurality of tendon pipes 470 is moved in the first direction ① or the second direction ②. In addition, as the plurality of tendon pipes 470 is moved in the first direction ① or the second direction ②, the plurality of tendons 430 is moved in the first direction ① or the second direction ②.

Further, as shown in FIG. 14, the plurality of first holders 440 includes a first lower holder 440a, and a first upper holder 440b. The first lower holder 440a is formed with a first groove 440c in which a portion of the plurality of tendon pipes 470 is inserted. The first groove 440c may be shaped like a semi-cylinder. The first upper holder 440b and the first lower holders 440a are coupled to each other. The first upper holder 440b is formed with a second groove 440d in which the other portion of the plurality of tendon pipes 470 is inserted. The second groove 440d may be shaped like a semi-cylinder, and formed to face toward the first groove 440c. When the first lower holder 440a and the first upper holder 440b are coupled to each other, the first groove 440c and the second groove 440d are formed like a cylinder. In addition, the plurality of tendon pipes 470 are inserted between the first groove 440c and the second groove 440d and fastened to the plurality of first holders 440.

The plurality of second holders 450 respectively supports the plurality of sheath pipes 480 so that the plurality of tendon pipes 470 can move in a lengthwise direction with respect to the plurality of sheath pipes 480.

Further, as shown in FIG. 15, the plurality of second holders 450 includes a second lower holder 450a, and the first upper holder 450b. The second lower holder 450a is formed with a third groove 450c in which a portion of the plurality of sheath pipes 480 is inserted. The third groove 450c may be shaped like a semi-cylinder. The second upper holder 450b and the second lower holder 450a are coupled to each other. The second upper holder 450b is formed with a fourth groove 450d in which the other portion of the plurality of sheath pipes 480 is inserted. The fourth groove 450d may be shaped like a semi-cylinder, and formed to face toward the third groove 450c. When the second lower holder 450a and the second upper holder 450b are coupled to each other, the third groove 450c and the fourth groove 450d are formed like a cylinder. In addition, the plurality of sheath pipes 480 are inserted between the third groove 450c and the fourth groove 450d and fastened to the plurality of second holders 450.

In addition, the plurality of second holders 450 includes a first sheath holder 451 to hold the first sheath pipe 481, and a second sheath holder 452 to hold the second sheath pipe 482. Further, as shown in FIG. 16, the tendon-sheath driving apparatus 400 includes a controller 500 to control the plurality of actuators 490.

The controller 500 controls the first actuator 491 and the second actuator 492 to simultaneously move the first tendon holder 441 and the second tendon holder 442. For example, when the controller 500 controls the first tendon holder 441 to move in the first direction ①, the controller 500 controls the second tendon holder 442 to move in the second direction ② opposite to the moving direction of the first tendon holder 441. As the first tendon holder 441 and the second tendon holder 442 are moved, the tendon 430 makes the joint 20 of the robot be rotated clockwise or counterclockwise.

Figure 17:
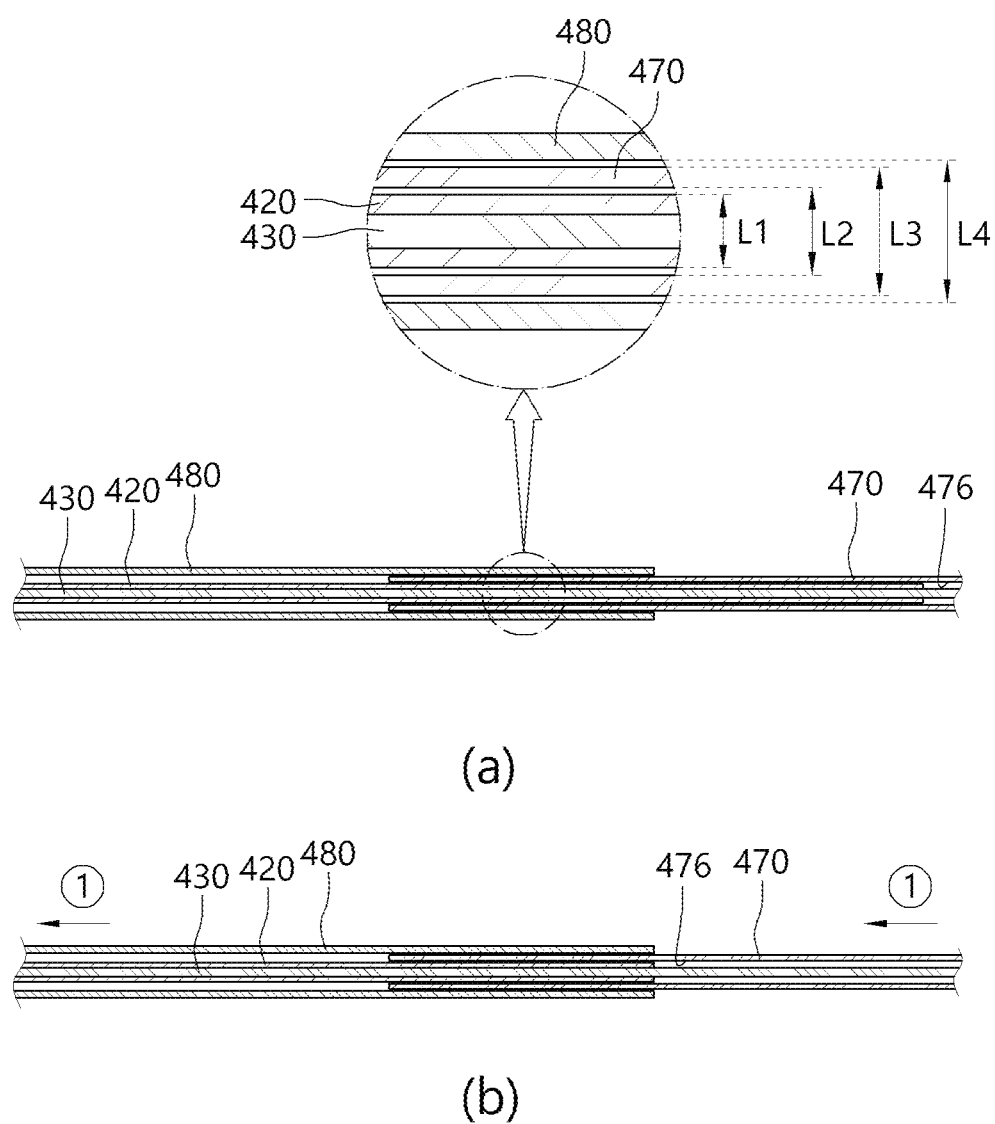
FIG. 17 is a diagram illustrating relative movement between a tendon and a sheath in a tendon-sheath driving apparatus according to still another embodiment of the disclosure.

FIG. 17 is a diagram illustrating relative movement between a tendon and a sheath in a tendon-sheath driving apparatus according to still another embodiment of the disclosure.

First, referring to (a) in FIG. 17, the inner diameter of the sheath 420 is greater than the outer diameter of the tendon 430.

The outer diameter L1 of the sheath 420 is smaller than the inner diameter L2 of the tendon pipe 470. Thus, the sheath 420 is moved inside a moving space 476 between the tendon 430 and the tendon pipe 470 as guided by the tendon pipe 470.

In addition, the outer diameter L3 of the tendon pipe 470 is smaller than the inner diameter L4 of the sheath pipe 480. Thus, the tendon pipe 470 is moved as guided by the sheath pipe 480. In addition, as shown in (b) of FIG. 17, when the tendon pipe 470 is moved in the first direction ①, the tendon 430 is also moved in the first direction ①.

In this case, the sheath 430 is maintained to surround the tendon 420 inside the sheath pipe 480, thereby preventing the tendon 430 from buckling inside the sheath pipe 480.

Figure 18:
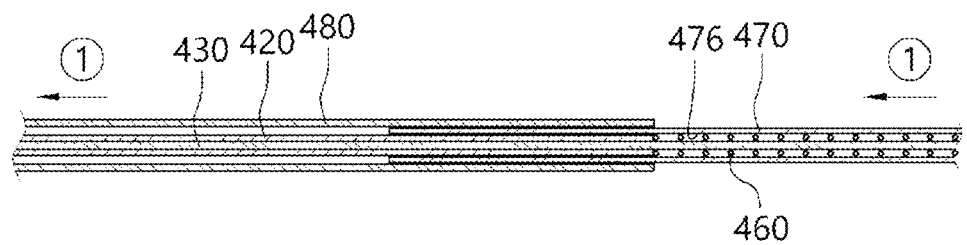
FIG. 18 is a diagram illustrating an alternative example of a tendon pipe.

FIG. 18 is a diagram illustrating an alternative example of a tendon pipe.

Referring to FIG. 18, the elastic unit 460 is provided inside the moving space 476 of the tendon pipe 470 while surrounding the tendon 430.

The elastic unit 460 is disposed in parallel with the sheath 430. In addition, the elastic unit 460 is provided in the form of a spring. However, the elastic unit 460 is not limited to the spring, but may have various forms as long as it is made of an elastic material and capable of surrounding the tendon 430.

In this case, the elastic unit 460 surrounds the tendon 430 inside the moving space 476, preventing the tendon 430 from buckling inside the moving space 476.

Figure 19:
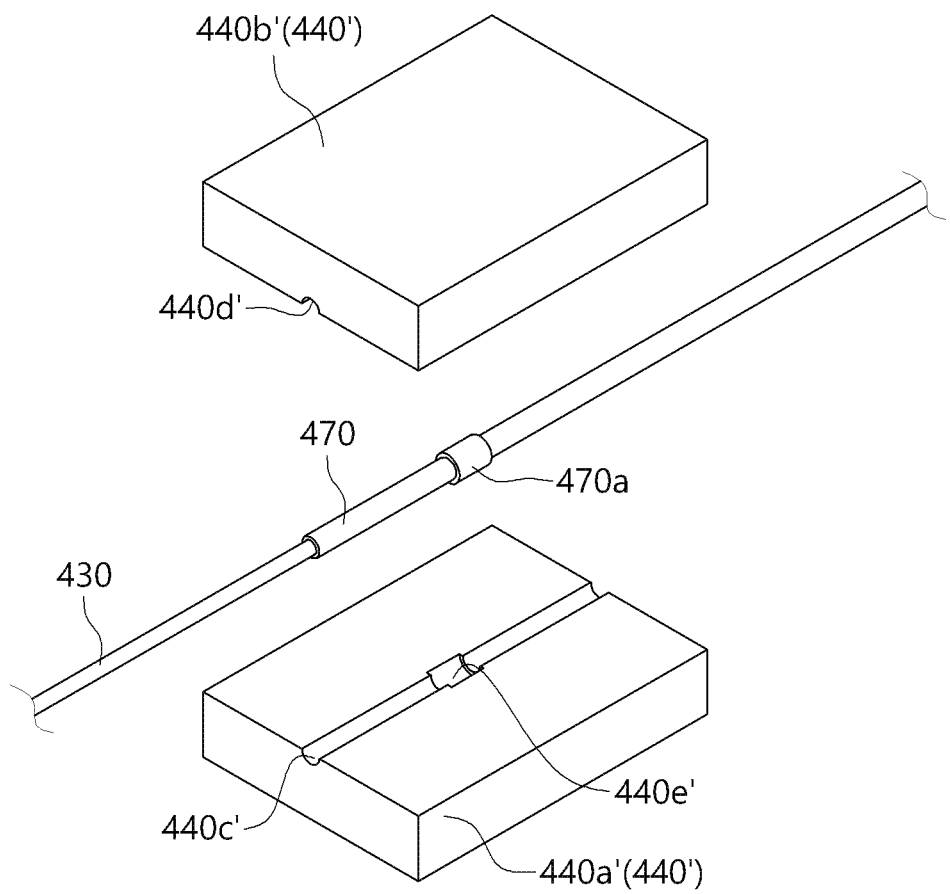
FIG. 19 is a diagram illustrating an alternative example of a first holder.

FIG. 19 is a diagram illustrating an alternative example of a first holder.

As shown in FIG. 19, a protrusion 470a is formed on the outer surface of the tendon pipe 470.

The protrusion 470a has a cylindrical shape. The protrusion 470a is fastened to the outer surface of the tendon pipe 470. Further, the outer surface of the tendon pipe 470 may be formed with an accommodating groove in which the protrusion 470a is partially accommodated.

Further, according to various embodiments of the disclosure, the protrusion 470a is not limited to the cylindrical shape, but may have various shapes, such as a rectangular box.

A first holder 440' is formed with a first groove 440c' in which a portion of the tendon pipe 470 is inserted.

In this case, the first groove 440c' includes a first protrusion groove 440e' in which a portion of the protrusion 470a is inserted. For example, the first protrusion groove 440e' is shaped like a semi-cylinder corresponding to the first protrusion 470a having a cylindrical shape. However, the first protrusion groove 440e' is not limited to the semi-cylindrical shape, but may be shaped corresponding to various shapes of the first protrusion 470a.

In addition, the protrusion 470a is inserted in and fastened to the first protrusion groove 440e'. Thus, the first holder 440' more firmly holds the tendon pipe 470.

Further, the tendon-sheath driving apparatus according to various embodiments of the disclosure is not limited to the structure where the first protrusion 470a is inserted in the first protrusion groove 440e', but may have various coupling structures for coupling the first holder 440' and the tendon pipe 470.

Meanwhile, according to various embodiments of the disclosure, a second protrusion is formed on the outer surface of the pipe 480 (see FIG. 15).

The second protrusion has a cylindrical shape. The second protrusion is fastened to the outer surface of the pipe 480. Further, according to various embodiments of the disclosure, the second protrusion is not limited to the cylindrical shape, but may have various shapes, such as a rectangular box.

In this case, the second groove 450c (see FIG. 15) includes a second protrusion groove in which a portion of the second protrusion is inserted. For example, the second protrusion groove may be shaped like a semi-cylinder to correspond to the second protrusion having a cylindrical shape. However, the second protrusion groove is not limited to the semicylindrical shape, but may be shaped corresponding to the second protrusion having various shapes.

In addition, the second protrusion is inserted in and fastened to the second protrusion groove. Thus, the second holder 450 more firmly holds the sheath pipe 480.

Further, the tendon-sheath driving apparatus according to various embodiments of the disclosure is not limited to a structure where the second protrusion is inserted in the second protrusion groove, but may have various coupling structures for coupling the second holder 450 and the sheath pipe 480.

The embodiments according to the disclosure have been described above, and it is obvious to a person having ordinary knowledge in the art that, the disclosure may be implemented as other specific forms as well as the foregoing embodiments without departing from the purpose and scope of the disclosure. Accordingly, the foregoing embodiments should be only illustrative and not restrictive for the disclosure, and thus the disclosure is not limited to the foregoing description, but may be modified within the scope of the appended claims and equivalents thereto.

DESCRIPTION OF REFERENCE NUMERALS

100: device for driving tendon-sheath
120: sheath
130: tendon
170: rod
180: pipe

What is claimed is:

1. A tendon-sheath driving apparatus comprising:
a first sheath having a predetermined length, being flexible and having a hollow shape;
a second sheath having a predetermined length, being flexible and having a hollow shape;
a first tendon, a portion of which is placed inside a hollow of the first sheath;
a second tendon, a portion of which is placed inside a hollow of the second sheath;
a first tendon rod coupled to the first tendon;
a second tendon rod coupled to the second tendon;
a first sheath pipe coupled to the first sheath;
a second sheath pipe coupled to the second sheath;
a first actuator configured to drive the first tendon rod;
a second actuator configured to drive the second tendon rod; and
a joint connected to the first tendon and the second tendon,
wherein the first tendon is configured to move through the first sheath and the first sheath pipe as the first tendon rod is moved through the first sheath pipe while a portion of the first tendon rod is inside the first sheath pipe, wherein the second tendon is configured to move through the second sheath and the second sheath pipe as the second tendon rod is moved through the second sheath pipe while a portion of the second tendon rod is inside the second sheath pipe, wherein the first actuator and the second actuator are configured to simultaneously cause movement of the first tendon rod and the second tendon rod, respectively, and wherein, when the first actuator causes the first tendon rod to move in a first direction, the second actuator is configured to cause the second tendon rod to move in a direction opposite to the first direction.

2. The tendon-sheath driving apparatus of claim 1, wherein:

an outer diameter of the first tendon rod is smaller than an inner diameter of the first sheath pipe, the inner diameter of the first sheath pipe is greater than or equal to an inner diameter of the first sheath, and a moving space in which the first tendon rod is movable is formed between the first tendon and the first sheath pipe, an outer diameter of the second tendon rod is smaller than an inner diameter of the second sheath pipe, the inner diameter of the second sheath pipe is greater than or equal to an inner diameter of the second sheath, and a moving space in which the second tendon rod is movable is formed between the second tendon and the second sheath pipe.

3. The tendon-sheath driving apparatus of claim 1, wherein the first tendon rod is coupled to the first tendon by being compressed against an outer surface of the first tendon, and the second tendon rod is coupled to the second tendon by being compressed against an outer surface of the second tendon.

4. The tendon-sheath driving apparatus of claim 1, further comprising:

a first tendon holder coupled to the first tendon rod;
a second tendon holder coupled to the second tendon rod;
the first actuator configured to move the first tendon holder along a longitudinal direction of the first sheath pipe, and
the second actuator configured to move the second tendon holder along a longitudinal direction of the second sheath pipe.

5. The tendon-sheath driving apparatus of claim 4, wherein the first tendon holder comprises:

a first lower holder comprising a first groove in which a portion of the first tendon rod is inserted; and
a first upper holder comprising a second groove in which another portion of the first tendon rod is inserted, and coupled to the first lower holder, and
wherein the first tendon rod is inserted in between the first groove and the second groove and held in the first tendon holder.

6. The tendon-sheath driving apparatus of claim 1, further comprising:

a first sheath holder being configured to hold the first sheath pipe such that the first tendon rod moves along a longitudinal direction of the first sheath pipe; and
a second sheath holder being configured to hold the second sheath pipe such that the second tendon rod moves along a longitudinal direction of the second sheath pipe.

7. The tendon-sheath driving apparatus of claim 6, wherein the first sheath holder comprises:

a second lower holder comprising a first groove in which a portion of the first sheath pipe is inserted;
a second upper holder comprising a second groove in which another portion of the first sheath pipe is inserted, and coupled to the second lower holder; and
the first sheath pipe is inserted in between the first groove and the second groove and held in the first sheath holder.

8. The tendon-sheath driving apparatus of claim 1, further comprising:

a first elastic unit provided inside the first sheath pipe, and configured to surround the first tendon between the first sheath and the first tendon rod; and
a second elastic unit provided inside the second sheath pipe, and configured to surround the second tendon between the second sheath and the second tendon rod.

9. The tendon-sheath driving apparatus of claim 8, wherein the first elastic unit is formed to guide the first tendon for linear motion inside the first sheath pipe, and wherein the second elastic unit is formed to guide the second tendon for linear motion inside the second sheath pipe.

10. A tendon-sheath driving apparatus comprising:

a first sheath having a predetermined length, being flexible and having a hollow shape;
a second sheath having a predetermined length, being flexible and having a hollow shape;
a first tendon placed inside a hollow of the first sheath;
a second tendon placed inside a hollow of the second sheath;
a first tendon pipe coupled to the first tendon, configured to receive the first sheath therein, and having higher rigidity than the first sheath;
a second tendon pipe coupled to the second tendon, configured to receive the second sheath therein, and having higher rigidity than the second sheath;
a first sheath pipe configured to receive the first sheath therein, and having higher rigidity than the first sheath, and
a second sheath pipe configured to receive the second sheath therein, and having higher rigidity than the second sheath,
wherein the first tendon is configured to move through the first sheath and the first sheath pipe as the first tendon pipe is moved through the first sheath pipe while a portion of the first tendon pipe is placed inside the first sheath pipe, and
wherein the second tendon is configured to move through the second sheath and the second sheath pipe as the second tendon pipe is moved through the second sheath pipe while a portion of the second tendon pipe is placed inside the second sheath pipe.

11. The tendon-sheath driving apparatus of claim 10, wherein an outer diameter of the first tendon pipe is smaller than an inner diameter of the first sheath pipe, and wherein an inner diameter of the second tendon pipe is smaller than an inner diameter of the second sheath pipe.

12. The tendon-sheath driving apparatus of claim 10, wherein an outer diameter of the first sheath is smaller than an inner diameter of the first tendon pipe, and wherein an inner diameter of the second sheath is smaller than an inner diameter of the second tendon pipe.

13. The tendon-sheath driving apparatus of claim 10, further comprising:

a first actuator configured to actuate the first tendon pipe to move relative to the first sheath pipe;

a second actuator configured to actuate the second tendon pipe to move relative to the second sheath pipe;

a first tendon holder configured to hold the first tendon pipe such that the first tendon pipe is configured to move relative to the first sheath pipe in a lengthwise direction;

a second tendon holder configured to hold the second tendon pipe such that the second tendon pipe is configured to move relative to the second sheath pipe in a lengthwise direction;

a first sheath holder configured to support the first sheath pipe; and a second sheath holder configured to support the second sheath pipe, wherein the first actuator is capable of actuating the first tendon holder to move, and wherein the second actuator is capable of actuating the second tendon holder to move.

14. The tendon-sheath driving apparatus of claim 13, wherein the first tendon holder comprises:

a first lower holder comprising a first groove in which a portion of the first tendon pipe is inserted; and a first upper holder comprising a second groove in which another portion of the first tendon pipe is inserted, and coupled to the first lower holder, wherein the first tendon pipe is inserted between the first groove and the second groove and held in the first tendon holder, wherein the first sheath holder comprises:

a second lower holder comprising a third groove in which a portion of the first sheath pipe is inserted; and a second upper holder comprising a fourth groove in which another portion of the first sheath pipe is inserted, and coupled to the second lower holder, and wherein the first sheath pipe is inserted and held in between the third groove and the fourth groove.

15. The tendon-sheath driving apparatus of claim 10, further comprising:

a moving space, in which the first sheath is movable, between the first tendon and the first tendon pipe, and a first elastic unit provided in the moving space, wherein the first elastic unit surrounds the first tendon.

16. The tendon-sheath driving apparatus of claim 1, wherein the first tendon rod is coupled to an outer surface of the first tendon, and has higher rigidity than the first tendon, and wherein the second tendon rod is coupled to an outer surface of the second tendon, and has higher rigidity than the second tendon.

17. The tendon-sheath driving apparatus of claim 1, wherein the first tendon and the second tendon are wound around an outer circumferential surface of the joint, and the joint is configured to rotate clockwise or counterclockwise by movements of the first tendon and the second tendon.

18. The tendon-sheath driving apparatus of claim 1, wherein an end of each of the first tendon and the second tendon is fastened to the joint, and the joint is configured to rotate clockwise or counterclockwise by movements of the first tendon and the second tendon.

19. The tendon-sheath driving apparatus of claim 1, wherein the joint is configured to rotate clockwise or counterclockwise by movements of the first tendon and the second tendon that are connected to the joint.

* * * * *